(12) United States Patent
Marti et al.

(10) Patent No.: US 11,275,442 B2
(45) Date of Patent: Mar. 15, 2022

(54) ECHOLOCATION WITH HAPTIC TRANSDUCER DEVICES

(71) Applicant: HARMAN INTERNATIONAL INDUSTRIES, INCORPORATED, Stamford, CT (US)

(72) Inventors: Stefan Marti, Oakland, CA (US); Joseph Verbeke, Mountain View, CA (US); Adam Boulanger, Palo Alto, CA (US); Davide Di Censo, Sunnyvale, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/319,330

(22) PCT Filed: Jul. 21, 2017

(86) PCT No.: PCT/US2017/043240
§ 371 (c)(1),
(2) Date: Jan. 19, 2019

(87) PCT Pub. No.: WO2018/017933
PCT Pub. Date: Jan. 25, 2018

(65) Prior Publication Data
US 2019/0227631 A1 Jul. 25, 2019

Related U.S. Application Data

(60) Provisional application No. 62/365,960, filed on Jul. 22, 2016.

(51) Int. Cl.
*G06F 3/01* (2006.01)
*H04R 1/46* (2006.01)
(Continued)

(52) U.S. Cl.
CPC .............. *G06F 3/016* (2013.01); *B60K 37/06* (2013.01); *B60Q 9/00* (2013.01); *B60W 50/16* (2013.01);
(Continued)

(58) Field of Classification Search
CPC ...... G06F 3/016; G06F 3/0414; G06F 3/0488; G06F 9/3004; G06F 2203/014;
(Continued)

(56) References Cited

U.S. PATENT DOCUMENTS

| 4,982,434 A | 1/1991 | Lenhardt et al. |
| 5,282,858 A | 2/1994 | Bisch et al. |

(Continued)

FOREIGN PATENT DOCUMENTS

| CN | 1646833 A | 7/2005 |
| CN | 1856763 A | 11/2006 |

(Continued)

OTHER PUBLICATIONS

Extended European Search Report for application No. 17831480.3 dated Nov. 21, 2019, 7 pages.
(Continued)

*Primary Examiner* — Jennifer N Welch
*Assistant Examiner* — Amy P Hoang
(74) *Attorney, Agent, or Firm* — Artegis Law Group, LLP

(57) ABSTRACT

One embodiment of the present disclosure sets forth a technique for determining the location of an object with a haptic transducer device. The technique includes configuring one or more haptic transducer devices to output a ping. The technique further includes configuring the one or more haptic transducer devices to detect a ping echo associated with the ping. The technique further includes identifying a location of an object based on the ping echo. The technique further includes configuring the one or more haptic trans-
(Continued)

ducer devices to generate haptic output based on the location of the object.

18 Claims, 12 Drawing Sheets

(51) Int. Cl.
| | | |
|---|---|---|
| *B60Q 9/00* | (2006.01) | |
| *B60W 50/16* | (2020.01) | |
| *G06F 9/30* | (2018.01) | |
| *B60K 37/06* | (2006.01) | |
| *G06F 3/041* | (2006.01) | |
| *G06F 3/0488* | (2022.01) | |

(52) U.S. Cl.
CPC .......... *G06F 3/0414* (2013.01); *G06F 3/0488* (2013.01); *G06F 9/3004* (2013.01); *H04R 1/46* (2013.01); *B60W 2552/00* (2020.02); *B60W 2554/00* (2020.02); *B60W 2555/20* (2020.02); *G06F 2203/014* (2013.01); *H04R 2460/13* (2013.01)

(58) Field of Classification Search
CPC ......... B60K 37/06; B60Q 9/00; B60W 50/16; B60W 2550/12; B60W 2550/20; H04R 1/46; H04R 2460/13
See application file for complete search history.

(56) References Cited

U.S. PATENT DOCUMENTS

| | | | |
|---|---|---|---|
| 6,139,488 A | 10/2000 | Ball | |
| 6,338,028 B1 | 1/2002 | Shelton et al. | |
| 6,377,693 B1 | 4/2002 | Lippa et al. | |
| 7,560,826 B2 | 7/2009 | Hijikata et al. | |
| 8,547,215 B2 | 10/2013 | Sanma et al. | |
| 8,845,110 B1* | 9/2014 | Worley, III | G03B 17/54 348/135 |
| 8,970,358 B2 | 3/2015 | Kiefer et al. | |
| 9,002,020 B1 | 4/2015 | Kim et al. | |
| 9,081,651 B2 | 7/2015 | Filev et al. | |
| 9,290,174 B1 | 3/2016 | Zagorski | |
| 9,317,119 B2 | 4/2016 | Hirose et al. | |
| 9,656,606 B1 | 5/2017 | Vose et al. | |
| 9,718,400 B2 | 8/2017 | Knobl et al. | |
| 9,827,811 B1 | 11/2017 | Mcnew et al. | |
| 9,827,904 B2 | 11/2017 | Modarres et al. | |
| 10,191,537 B2 | 1/2019 | Tanaka et al. | |
| 10,235,848 B2 | 3/2019 | Billington et al. | |
| 10,275,029 B2 | 4/2019 | Jones et al. | |
| 10,282,981 B1 | 5/2019 | Nepomuceno et al. | |
| 10,479,271 B2 | 11/2019 | Hashimoto et al. | |
| 2003/0168838 A1 | 9/2003 | Breed et al. | |
| 2004/0049323 A1 | 3/2004 | Tijerina et al. | |
| 2006/0284839 A1* | 12/2006 | Breed | B62D 1/046 345/156 |
| 2007/0236450 A1 | 10/2007 | Colgate et al. | |
| 2008/0173092 A1 | 7/2008 | Hattori et al. | |
| 2008/0174451 A1 | 7/2008 | Harrington et al. | |
| 2009/0073112 A1 | 3/2009 | Basson et al. | |
| 2009/0076723 A1 | 3/2009 | Moloney | |
| 2009/0219252 A1 | 9/2009 | Jarventie et al. | |
| 2009/0250267 A1 | 10/2009 | Heubel et al. | |
| 2009/0259372 A1 | 10/2009 | Hijikata et al. | |
| 2009/0284485 A1 | 11/2009 | Colgate et al. | |
| 2010/0013613 A1 | 1/2010 | Weston | |
| 2010/0085168 A1 | 4/2010 | Kyung et al. | |
| 2010/0198458 A1 | 8/2010 | Buttolo et al. | |
| 2011/0310028 A1 | 12/2011 | Camp, Jr. et al. | |
| 2011/0319703 A1 | 12/2011 | Wiskerke et al. | |
| 2012/0126965 A1 | 5/2012 | Sanma et al. | |
| 2012/0194483 A1 | 8/2012 | Deluca | |
| 2012/0245406 A1 | 9/2012 | Aghamohammadi | |
| 2012/0306631 A1 | 12/2012 | Hughes | |
| 2013/0127755 A1* | 5/2013 | Lynn | G08B 6/00 345/173 |
| 2013/0155020 A1 | 6/2013 | Heubel et al. | |
| 2013/0222311 A1 | 8/2013 | Pesonen | |
| 2014/0005682 A1 | 1/2014 | Worrell et al. | |
| 2014/0306891 A1 | 10/2014 | Latta et al. | |
| 2014/0309880 A1 | 10/2014 | Ricci | |
| 2014/0310594 A1 | 10/2014 | Ricci et al. | |
| 2014/0320402 A1 | 10/2014 | Stahlberg | |
| 2014/0346823 A1 | 11/2014 | Stebbins et al. | |
| 2014/0350640 A1 | 11/2014 | Patrick et al. | |
| 2014/0363033 A1 | 12/2014 | Heiman et al. | |
| 2015/0018660 A1 | 1/2015 | Thomson et al. | |
| 2015/0070148 A1 | 3/2015 | Cruz-Hernandez et al. | |
| 2015/0097657 A1 | 4/2015 | Gandhi et al. | |
| 2015/0175172 A1 | 6/2015 | Truong | |
| 2015/0197283 A1 | 7/2015 | Marti et al. | |
| 2015/0199950 A1 | 7/2015 | Heiman et al. | |
| 2015/0268722 A1 | 9/2015 | Wang et al. | |
| 2015/0268726 A1 | 9/2015 | Saboune et al. | |
| 2015/0293592 A1 | 10/2015 | Cheong | |
| 2015/0306312 A1 | 10/2015 | Palerm | |
| 2015/0307105 A1 | 10/2015 | Huber | |
| 2015/0314681 A1 | 11/2015 | Riley, Sr. et al. | |
| 2016/0004309 A1 | 1/2016 | Modarres et al. | |
| 2016/0107570 A1 | 4/2016 | Modarres et al. | |
| 2016/0179198 A1 | 6/2016 | Levesque et al. | |
| 2016/0187979 A1 | 6/2016 | Nahman et al. | |
| 2016/0207454 A1 | 7/2016 | Cuddihy et al. | |
| 2016/0209944 A1* | 7/2016 | Shim | G06F 3/0443 |
| 2016/0217778 A1* | 7/2016 | Iermenko | G10H 3/26 |
| 2016/0357264 A1 | 12/2016 | Tissot | |
| 2017/0021762 A1 | 1/2017 | Daman | |
| 2017/0090576 A1 | 3/2017 | Peterson et al. | |
| 2017/0169673 A1 | 6/2017 | Billington et al. | |
| 2017/0249810 A1 | 8/2017 | Zerick et al. | |
| 2017/0262164 A1 | 9/2017 | Jain et al. | |
| 2017/0336903 A1 | 11/2017 | Rivaud et al. | |
| 2018/0335847 A1* | 11/2018 | Levesque | G06F 3/016 |
| 2019/0047591 A1 | 2/2019 | Augst | |
| 2019/0122525 A1 | 4/2019 | Lancelle | |

FOREIGN PATENT DOCUMENTS

| | | |
|---|---|---|
| CN | 101424975 A | 5/2009 |
| CN | 103568949 A | 2/2014 |
| CN | 104756173 A | 7/2015 |
| CN | 104816727 A | 8/2015 |
| EP | 1 956 466 A1 | 8/2008 |
| JP | H08-166450 | 6/1996 |
| JP | 2004-158961 A | 6/2004 |
| JP | 2005-040376 A | 2/2005 |
| JP | 2005-047327 A | 2/2005 |
| JP | 2005-080227 A | 3/2005 |
| JP | 2006-199094 A | 8/2006 |
| JP | 2007-065798 A | 3/2007 |
| JP | 2008-039497 A | 2/2008 |
| JP | 2008-171383 A | 7/2008 |
| JP | 2010-066640 A | 3/2010 |
| JP | 2010-118877 A | 5/2010 |
| JP | 2010-518500 A | 5/2010 |
| JP | 2012-048378 A | 3/2012 |
| JP | 2012-155526 A | 8/2012 |
| JP | 2013-053867 A | 3/2013 |
| JP | 2015-502888 A | 1/2015 |
| JP | 2015-079289 A | 4/2015 |
| JP | 2015-130187 A | 7/2015 |
| JP | 2015-186072 A | 10/2015 |
| JP | 2016-078602 A | 5/2016 |
| KR | 10-2010-0114605 A | 10/2010 |
| WO | 2010/105006 A1 | 9/2010 |
| WO | 2010/105011 A1 | 9/2010 |
| WO | 2015/054789 A1 | 4/2015 |
| WO | 2015/086919 A2 | 6/2015 |

(56) References Cited

OTHER PUBLICATIONS

International Search Report for application No. PCT/US2017/037619 dated Sep. 27, 2017, 7 pages.
Non-Final Rejection received for U.S. Appl. No. 16/319,316, dated Aug. 14, 2019, 20 pages.
Notice of Allowance received for U.S. Appl. No. 16/319,316, dated Dec. 13, 2019, 14 pages.
Extended European Search Report for application No. 17831478.7 dated Nov. 21, 2019, 7 pages.
International Search Report for application No. PCT/US2017/037593 dated Sep. 7, 2017, 7 pages.
Non-Final Rejection received for U.S. Appl. No. 16/319,331, dated Jan. 10, 2020, 24 pages.
Extended European Search Report for application No. 17831936.4 dated Nov. 22, 2019, 7 pages.
International Search Report for application No. PCT/US2017/043238 dated Oct. 2, 2017, 7 pages.
Non-Final Rejection received for U.S. Appl. No. 16/319,319, dated Dec. 27, 2019, 26 pages.
Extended European Search Report for application No. 17831937.2 dated Nov. 26, 2019, 8 pages.
Extended European Search Report for application No. 17831989.3 dated Nov. 29, 2019, 8 pages.
International Search Report for application No. PCT/US2017/043374 dated Oct. 6, 2017, 14 pages.
Non-Final Rejection received for U.S. Appl. No. 16/319,332, dated Nov. 27, 2019, 28 pages.
Extended European Search Report for application No. 17831938.0 dated Dec. 6, 2019, 7 pages.
International Search Report for application No. PCT/US2017/043242 dated Sep. 29, 2017, 9 pages.
International Search Report for Application No. PCT/US2017/043240, dated Sep. 29, 2017, 9 pages.
Final Office Action for U.S. Appl. No. 16/319,331, dated Jun. 15, 2020, 15 pages.
Final Office Action for U.S. Appl. No. 16/319,332, dated Jun. 15, 2020, 16 pages.
Non-Final Office Action for U.S. Appl. No. 16/319,331 dated Jan. 10, 2020, 18 pages.
Non-Final Office Action received for U.S. Appl. No. 16/319,332, dated Aug. 18, 2020, 19 pages.
Yoshino et al., "Tactile Feedback in 2.5 Dimensional Touch Screen", The Proceedings of JSME annual Conference on Robotics and Mechatronics, The Japan Society of Mechanical Engineers, May 24, 2014, pp. 3P2-E07(1)-3P2-E07(3).

\* cited by examiner

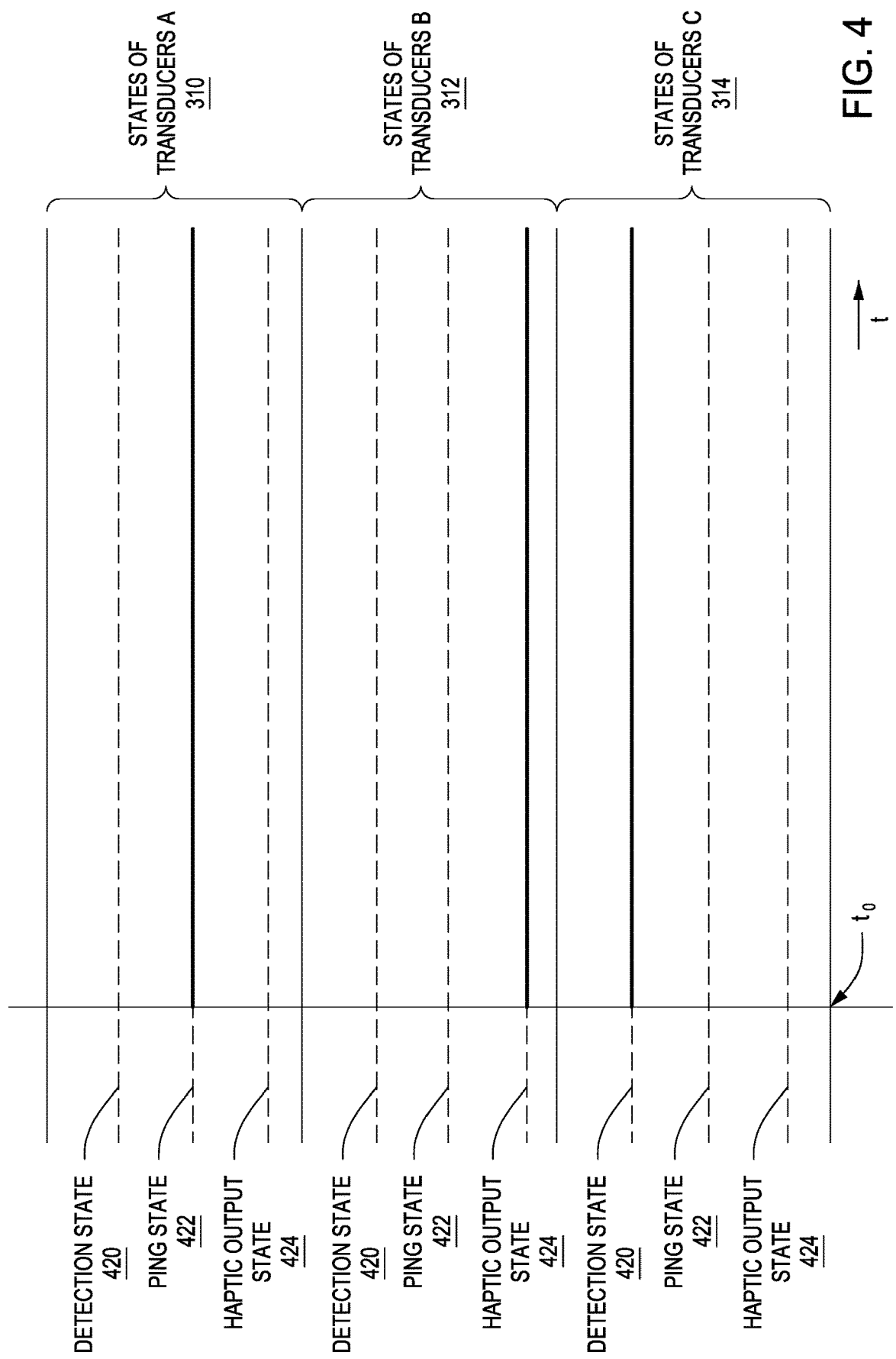

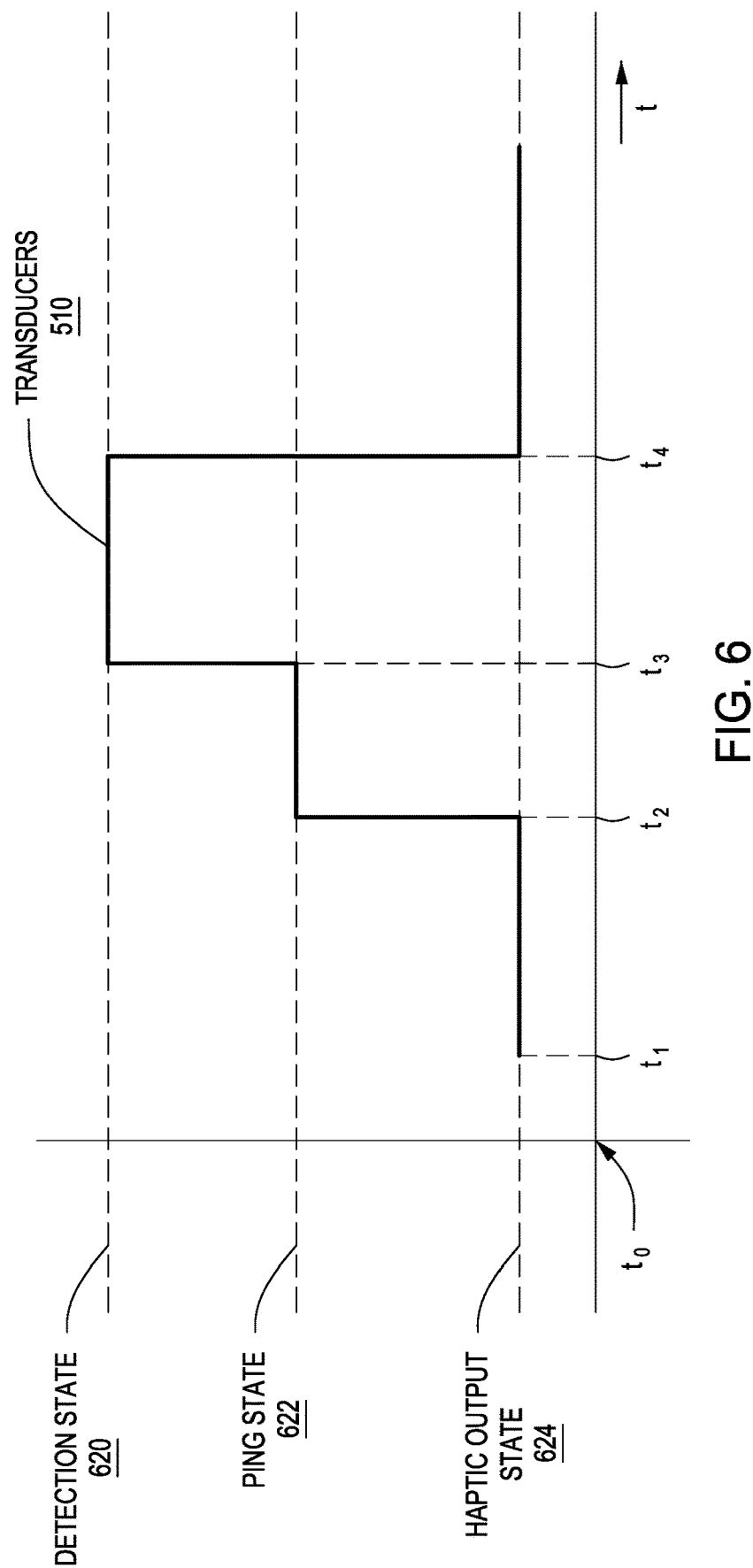

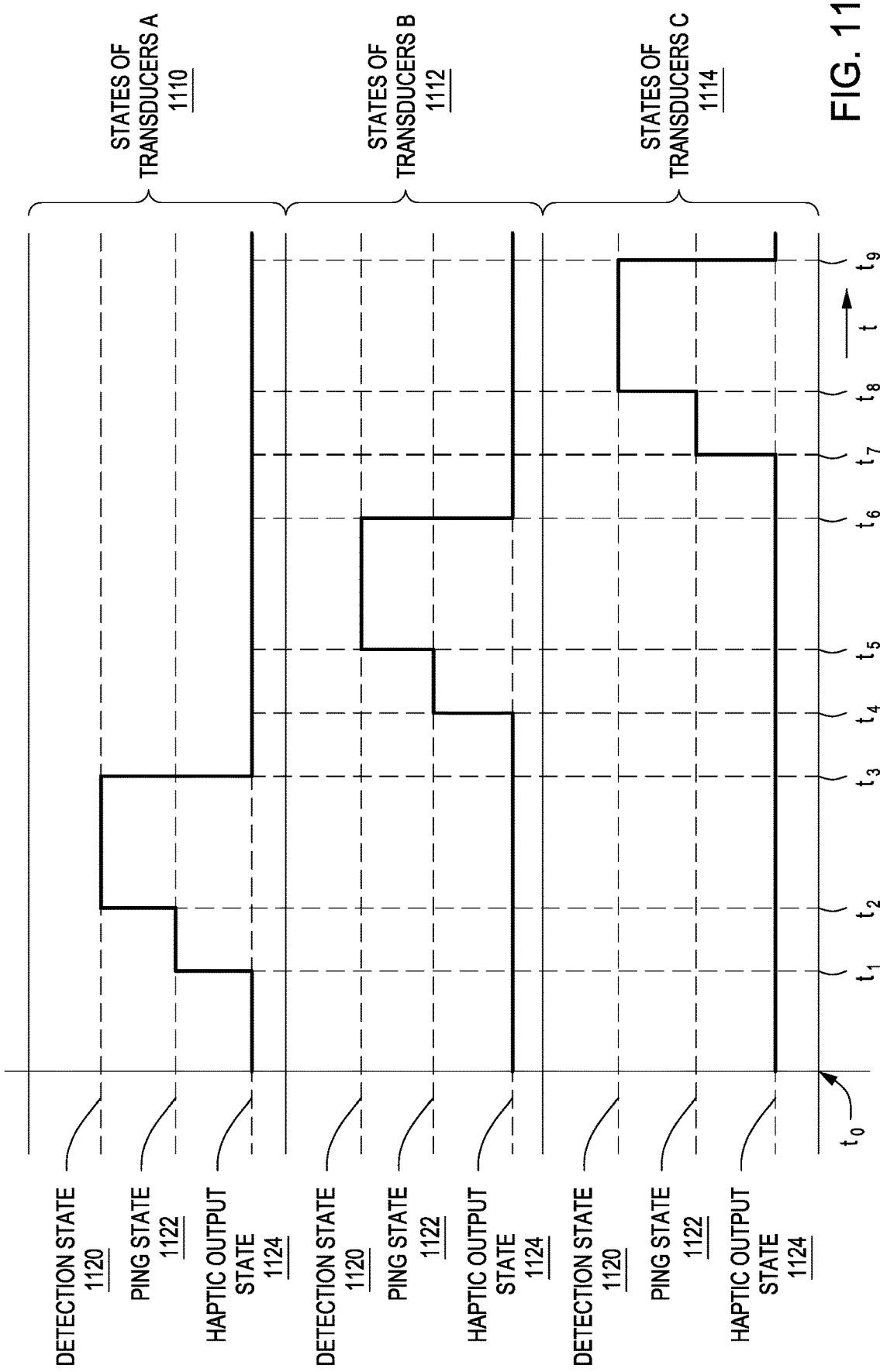

ECHOLOCATION WITH HAPTIC TRANSDUCER DEVICES

CROSS-REFERENCE TO RELATED APPLICATIONS

The present application is a national stage application of the international application titled, "ECHOLOCATION WITH HAPTIC TRANSDUCER DEVICES," filed on Jul. 21, 2017 and having application number PCT/US2017/043240, which claims priority benefit of the United States Provisional Patent Application titled, "VEHICLE INTERFACE SYSTEMS," filed on Jul. 22, 2016 and having Ser. No. 62/365,960. The subject matter of these related applications is hereby incorporated herein by reference.

CROSS-REFERENCE TO RELATED APPLICATIONS

This application claims benefit of U.S. provisional patent application Ser. No. 62/365,960, filed Jul. 22, 2016, which is hereby incorporated herein by reference.

BACKGROUND

Field of the Embodiments

The various embodiments relate generally to haptic transducers and, more specifically, to echolocation with haptic transducer devices.

Description of the Related Art

Sensors are used pervasively in a variety of technology areas for object detection, identification, and tracking. In particular, infrared sensors may be implemented in robots to facilitate the robots in detecting the presence of objects in the environment. Visual sensors may be included in a surveillance system to facilitate the surveillance system in identifying one or more objects in the environment. Also, vibration sensors may be embedded in a surface in order to track a user's movements on that surface. For example, vibration sensors could be included in a touchscreen interface to determine the location of a user's finger on the touchscreen interface.

Sensors are configured to monitor a selected field-of-view for a particular type of indicator. For example, a photosensitive sensor could be placed in a room to monitor the room for the presence of electromagnetic waves. If the sensor detects an electromagnetic wave, the sensor could generate a notification and could transmit the notification to a processor associated with the photoelectric sensor. If the number of notifications generated in a given time interval exceeds a threshold, then the processor could determine that a light source is present in the room. Similarly, an infrared sensor may generate a notification when an infrared ray is incident on the infrared sensor. The infrared sensor may also transmit a notification that indicates one or more parameters of the detected infrared ray to a processor. Based on the number of notifications generated and/or the one or more parameters generated by the infrared sensor, the processor may determine that a human is located at a particular position relative to the infrared sensor.

Conventionally, in response to the detection of an object in the environment, a processor configures a second device to perform a function. For example, in response to detecting electromagnetic waves in the environment, the processor may configure a second device to vary the position of a light polarizer in order to filter the electromagnetic waves. In addition, a processor could activate a visual display in response to detecting the presence of a human at a particular position with respect to the infrared sensors.

One drawback of these types of conventional sensors is that they rely on external devices to facilitate interactions with detected objects in the environment. However, multi-device systems are typically larger and have a higher bill of materials than single device systems. In addition, implementing multi-device systems in size-constrained systems may dramatically increase the size and cost of manufacturing a variety of devices, such as mobile and/or wearable devices.

As the foregoing illustrates, techniques for designing devices that can perform sensing functions and interact with objects in the environment would be useful.

SUMMARY

Embodiments of the present disclosure set forth a method for determining the location of an object with a haptic transducer device. The method includes configuring one or more haptic transducer devices to output a ping. The method further includes configuring the one or more haptic transducer devices to detect a ping echo associated with the ping. The method further includes identifying a location of an object based on the ping echo. The method further includes configuring the one or more haptic transducer devices to generate haptic output based on the location of the object.

Further embodiments provide, among other things, a system and a non-transitory computer-readable storage medium configured to implement the techniques set forth above.

At least one advantage of the techniques described herein is that the position of a user can be determined by mid-air haptic systems without using external sensors. The techniques described herein implement haptic transducer devices for both object detection and haptic sensation generation. Mid-air haptic systems that do not use external sensors are both smaller and less expensive to implement than conventional types of mid-air haptic systems. Accordingly, the techniques described herein can be implemented to design mid-air haptic systems for size and cost constrained systems, such as mobile and/or wearable devices. In particular, these techniques would be advantageously implemented in smartphones, smart watches, tablets, health monitoring wristbands, head mounted devices, and various other types of wearable and mobile devices. In addition, portable speakers and headphones would also benefit from the reduced bill of materials that the disclosed techniques enable. Furthermore, the disclosed techniques may be beneficial to Augmented Reality and Virtual Reality (AR/VR) systems. For example, the disclosed techniques could be implemented in stationary AR/VR systems included in tables, walls, ceilings, etc. Moreover, these techniques could be further implemented in wearable AR/VR systems, such as head mounted AR/VR devices.

BRIEF DESCRIPTION OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

FIG. 4 illustrates a state diagram of the operation of transducers A, transducers B, and transducers C of a transducer array in the dedicated mode, according to various embodiments;

FIG. 6 illustrates a state diagram of the operation of haptic transducer devices of a transducer array in the switching mode, according to various embodiments;

FIG. 11 illustrates a state diagram of a transducer array for implementing the switching mode, where each set of haptic transducer devices execute a sequence of functions in a successive manner, according to various embodiments.

DETAILED DESCRIPTION

Figure 1:
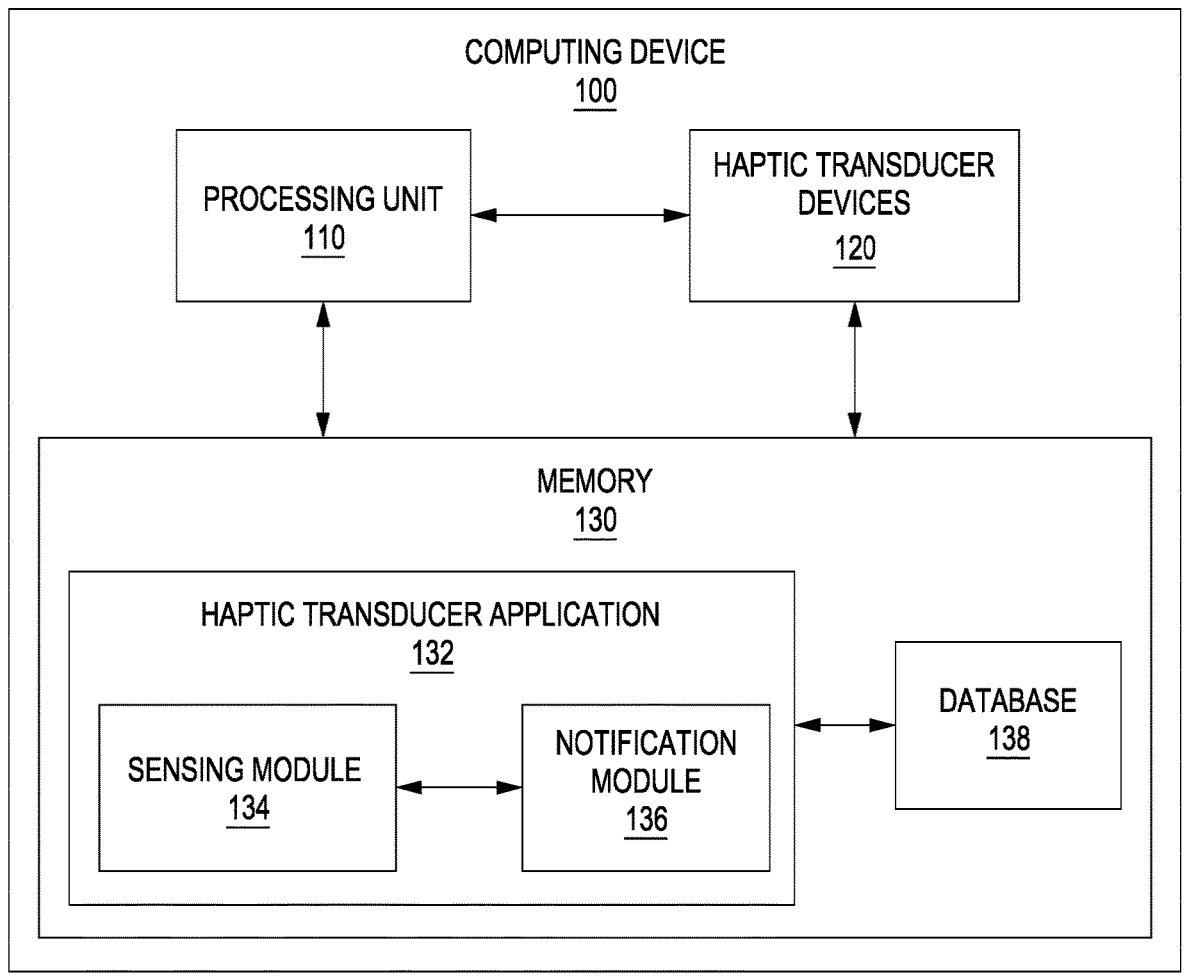
FIG. 1 illustrates a block diagram of a computing device configured to implement one or more aspects of the present disclosure, according to various embodiments.

FIG. 1 illustrates a block diagram of a computing device 100 configured to implement one or more aspects of the present disclosure, according to various embodiments. Computing device 100 as a whole may be a microprocessor, an application-specific integrated circuit (ASIC), a system-on-a-chip (SoC), and so forth. As shown, computing device 100 includes, without limitation, processing unit 110, haptic transducer devices 120, and memory 130.

Processing unit 110 may include a central processing unit (CPU), a digital signal processing unit (DSP), a sensor processing unit, a controller unit, and so forth. Processing unit 110 may be physically embedded into computing device 100, may be part of a cloud-based computing environment, and/or may be physically introduced into computing device 100 by a user, such as in a mobile or wearable device. In some embodiments, processing unit 110 may be an element of an external system, such as an in-vehicle infotainment system, a climate control unit, a telemetry control unit, etc. within a vehicle. In general, the vehicle may include any type of transportation device, including, without limitation, a car, a truck, a motorbike, a boat, a submarine, a personal watercraft, a snow mobile, an airplane, a space craft, and so forth. Furthermore, the vehicle may be stationary, such as a remote control station for drones. In various embodiments, processing unit 110 is configured to execute applications, such as haptic transducer application 132, included in memory 130.

Haptic transducer devices 120 include one or more types of devices that can detect and generate one or more types of waves (e.g., mechanical waves, electromagnetic waves, etc.). For example, haptic transducer devices 120 could include ultrasonic transducer arrays, which both generate and detect ultrasonic waves. Haptic transducer devices 120 generate waves (e.g., continuous waves, wave pulses, pings etc.) which can be used to determine the location of objects in the environment. The waves travel into the environment and reflect off of objects in the environment. Haptic transducer devices 120 detect reflected waves and transmit signals to processing unit 110 that indicate that a wave was detected and may further indicate one or more characteristics of the wave. Haptic transducer devices 120 may transmit the signals via a controller area network, a local interconnect network, a FlexRay®, and so forth. In addition, haptic transducer devices 120 emit waves in order to generate a haptic sensation on an object. In one embodiment, haptic transducer devices 120 generate continuous waves that generate a haptic sensation on a user. In another embodiment, haptic transducers 120 emit wave pulses that generate a haptic sensation on the user.

With respect to generating waves for determining the location of an object, haptic transducer devices 120 generate a wave pulse (referred to herein as a "ping") with a particular waveform, frequency, and amplitude. In some embodiments, haptic transducer devices 120 generate a ping with increasing or decreasing frequency. For example, an ultrasonic transducer included in haptic transducer devices 120 could modulate the frequency of ultrasonic waves being generated in order to generate a ping with an increasing frequency. In addition, a ping could have intervals of increasing and decreasing frequency and/or amplitude.

In addition to generating pings, haptic transducer devices 120 detect various types of waves that are incident on haptic transducer devices 120. Haptic transducer devices 120 convert the detected waves into an electrical signal that is transmitted to processing unit 110. The electrical signal indicates that a wave has been detected. The electrical signal may further indicate one or more characteristics of the wave, including the waveform, the frequency, and the amplitude of the wave. For example, haptic transducer devices 120 could detect ultrasonic waves that have reflected off of a target and have traveled towards haptic transducer devices 120. In one embodiment, haptic transducer devices 120 detect ping echoes of pings that have reflected off of an object in the environment.

With respect to generating a haptic sensation on a user, haptic transducer devices 120 generate various types of haptic output, including pings and continuous waves. For example, haptic transducer devices 120 could include ultrasonic transducers included in ultrasonic transducer arrays that generate ultrasonic waves. Haptic transducer devices 120 may be configured to generate waves that travel towards a particular part of a user, including his or her hand, leg, forearm, wrist, palm, neck, trunk, etc. When an ultrasonic wave interacts with a user's skin, the person may feel a haptic sensation. In some embodiments, haptic transducer devices 120 generate a particular type of haptic sensation that may indicate to a user that he or she should take a particular action. For example, the haptic sensation could move in a certain direction on the user's body, thereby indicating to the user that she should move in the specified direction. Haptic transducer devices 120 may further generate a haptic sensation with a particular size, shape, orientation, and/or intensity.

As discussed above, haptic transducer devices 120 generate pings, detect ping echoes, and generate haptic sensations. In one embodiment, haptic transducer devices 120 operate in one of a dedicated mode, a switching mode, and a hybrid mode. In the dedicated mode, each of haptic transducer devices 120 is configured to execute a single function. In one embodiment, in the dedicated mode, the single function performed by one of haptic transducer devices 120 is one of: generating pings, detecting waves, or generating haptic output. In the switching mode, haptic transducer devices 120 are configured to switch between generating pings, detecting waves, and generating haptic output. For example, all of haptic transducer devices 120 could be configured to switch from generating pings to detecting waves within a certain period of time. In another embodiment, half of haptic transducer devices 120 could generate pings and half of haptic transducer devices 120 could detect waves. Then, after a set period of time, haptic transducer devices 120 that were detecting waves could generate pings and haptic transducer devices 120 that were generating pings could detect waves. Alternatively or additionally, some or all of haptic transducer devices 120 could switch to generating sensations on a user. In the hybrid mode, at least one of haptic transducer devices 120 is configured to switch between generating pings, detecting waves, and/or generating haptic output and at least one of the haptic output devices 120 is configured to only generate pings, detect waves, or generate haptic output during any given period of time.

Memory 130 includes haptic transducer application 132 configured to communicate with database 138. Processing unit 110 executes haptic transducer application 132 to implement the overall functionality of computing device 100. In a manner that is similar to processing unit 110, memory device 130 may be embedded in an external computing environment or may be physically part of computing device 100. Moreover, memory device 130 may be included in a cloud-based computing environment.

Database 138 may store the types, locations, and orientations of haptic transducer devices 120. In addition, for each type of haptic transducer device 120, database 138 may store various parameters including the amplitude and frequency range of the type of haptic output device 120, the waveform shapes that can be generated by the type of haptic output device 120, and various possible device configurations of that type of haptic output device 120. Similarly, database 138 may store the types of waves, waveforms, frequencies, and amplitudes that each type of device in haptic transducer devices 120 can detect. Database 138 may also store instructions for configuring haptic transducer devices 120 to operate in the dedicated mode, the switching mode, and the hybrid mode. In addition, database 138 may store the positions and orientations of haptic transducer devices 120 as well as user preferences data relating to the types of haptic sensations to generate on the user (e.g., the part of the user on which to generate haptic sensations). Database 138 may also store look-up tables, algorithms, etc. for analyzing data in order to identify various types of objects that may be proximate to haptic transducer devices 120.

Haptic transducer application 132 includes sensing module 134 and notification module 136. In some embodiments, sensing module 134 configures at least one of haptic transducer devices 120 to emit a ping by generating wave pulses having a constant or variable frequency. Further, sensing module 134 configures at least one of haptic transducer devices 120 to detect ping echoes, for example the wave pulses that are reflected back to haptic transducer devices 120 after a ping encounters an object in the environment. Sensing module 134 analyzes ping echoes detected by haptic transducer devices 120 in order to determine various characteristics of the environment proximate to haptic transducer devices 120. For example, sensing module 134 could associate a ping echo with an emitted ping and further calculate the time interval between haptic transducer devices 120 emitting the ping and detecting the ping echo (e.g., by comparing the waveforms, frequency patterns, and amplitudes of the detected ping echo to the emitted ping). Based on the calculated time interval and various parameters of the particular ping, sensing module 134 could determine the position of an object in the environment. In particular, sensing module 134 could determine the distance that the ping traveled in the air before being reflected off of an object. In one embodiment, sensing module 134 divides the calculated time interval by twice the speed of the wave associated with the ping in order to determine the distance that the ping traveled before being reflected off of an object. Sensing module 134 may use that distance to determine the location of the object with respect to one or more of haptic transducer devices 120.

Furthermore, sensing module 134 could identify, based on the sensor data, the type of object that is proximate to haptic transducer devices 120. In one embodiment, sensing module 134 utilizes a large number of pings with distinct frequencies and/or frequency patterns in order to image the fine structure details of the object. In such an embodiment, upon identifying the location of an object proximate to haptic transducer devices 120, sensing module 134 may configure haptic transducer devices 120 to increase the frequency spectrum utilized when generating pings. Sensing module 134 may then be able to identify the type of object, the orientation of the object, and surface details of the object by analyzing ping echoes. In addition, sensing module 134 may determine other characteristics of the object, such as the manner in which the object is moving in the environment. For example, sensing module 134 could calculate the radial velocity of an object by calculating the Doppler shift between emitted pings and detected ping echoes.

In some embodiments, sensing module 134 may configure some or all of haptic transducer devices 120 to operate in the switching mode, the dedicated mode, or the hybrid mode. For example, sensing module 134 could configure one subset of haptic transducer devices 120 to operate in the switching mode, while configuring another subset of haptic transducer devices 120 to operate in a dedicated mode. Alternatively, sensing module 134 could configure all of haptic transducer devices 120 to operate in the hybrid mode.

In some embodiments, sensing module 134 may configure the subset of haptic transducer devices 120 that are closest to a target object to operate in the dedicated mode, while the subset of haptic transducer devices 120 that are further away from the target object may operate in the switching mode. Such a configuration may facilitate the subset of haptic transducer devices 120 that are closest to the target object in detecting ping echoes that would otherwise travel past haptic transducer devices 120 before sensing module 134 could configure haptic transducer devices 120 to detect the ping echoes. However, for the subset of haptic transducer devices 120 that are further away from the target object, sensing module 134 may implement the switching mode in order to configure haptic transducer devices 120 to generate pings across a broad frequency spectrum. For example, each haptic transducer device 120 could emit pings with a distinct frequency/frequency pattern. Because these haptic transducer devices 120 are further away from the target object, the likelihood of a ping echo traveling past haptic transducer devices 120 before haptic transducer devices 120 switch to detecting pings is reduced. In addition, utilizing an increased number of frequencies/frequency patterns provides sensing module 134 with more sets of ping-ping echo pairs for calculating the location of the object as well as determining other characteristics of the object (e.g., the shape of the object).

Sensing module 134 images the environment proximate to haptic transducer devices 120 by analyzing ping echoes to determine the location of objects in the environment. As described above, sensing module 134 may configure haptic transducer devices 120 to generate pings with various frequency, amplitude, and waveform characteristics in order to generate more sets of unique ping-ping echo pairs. Increasing the number of unique sets of ping-ping echo pairs facilitates sensing module 134 in generating a higher resolution image of the environment. Based on the image, sensing module 134 generates object data that includes the position and characteristics of the objects in the environment detected by analyzing ping echoes. Sensing module 134 transmits the object data to notification module 136.

Notification module 136 processes object data received from sensing module 134 and, in response, generates one or more control signals for configuring haptic transducer devices 120 to generate haptic output. Haptic transducer devices 120, in response to the control signals, generate a particular type of haptic sensation on the user.

In operation, based on the object data, notification module 136 determines whether a haptic sensation should be generated. For example, notification module 136 could access database 138 to scan a look-up table to determine if a particular type of object is associated with any type of haptic sensation. Additionally or alternatively, if the object is identified as being a part of the user (e.g., the user's hand), notification module 136 may access vehicle pre-sets and user preferences to determine whether a certain type of haptic sensation, if any, should be generated on the user.

In the case that sensing module 134 identifies the object as being the user and notification module 136 determines that a haptic sensation should be generated, notification module 136 may access user preference data and vehicle pre-sets from database 138 in order to determine one or more parameters of the haptic sensation to generate on the user. These parameters may include the time at which to generate the sensation. For example, notification module 136 could access user preference data from database 138 in order to determine the time at which a particular type of haptic sensation should be generated on a particular part of the user.

If haptic transducer devices 120 are in the switching mode or the hybrid mode, then notification module 136 may determine a time at which to switch haptic transducer devices 120 from generating pings and/or detecting ping echoes to generating haptic sensations. Additionally or alternatively, notification module 136 may configure haptic transducer devices 120 to operate in the dedicated mode so that a subset of haptic transducer devices 120 are configured to generate a haptic sensation on the user at any given point in time.

Notification module 136 accesses the positions, orientations, and types of haptic transducer devices 120 in computing device 100 from database 138. In various embodiments, haptic transducer devices 120 may include ultrasonic transducers. Ultrasonic transducers may be arranged in arrays (e.g., 4-by-4, 8-by-8, 16-by-16, etc.). Each ultrasonic transducer emits ultrasonic waves of a certain frequency, phase, and intensity. Notification module 136 configures the ultrasonic transducers in a manner such that haptic output generated by two or more ultrasonic transducers occupy a particular location in space at a particular time. When this occurs, the haptic output of each ultrasonic transducer interferes constructively and/or destructively with the haptic output of one or more other ultrasonic transducers. Notification module 136 configures ultrasonic transducers such that the constructive and/or destructive interference occurs at the location at which the haptic output reaches the user, thereby generating a specific type of haptic sensation on the user. By modifying the intensity, phase, and frequency of the haptic output of each ultrasonic transducer, notification module 136 shifts the location of intensity peaks, increases or decreases the number of intensity peaks, and/or adjusts the shape and/or magnitude of one or more intensity peaks. In this manner, notification module 136 configures ultrasonic transducers and/or haptic transducer devices 120 in general to generate a specific type of haptic sensation on the user.

Notification module 136 further analyzes object data to determine if the user is moving and configures haptic output device 150 to generate a sensation on the user that tracks the user's movements. In addition, notification module 136 may configure haptic transducer devices 120 to generate a haptic sensation that has a movement pattern and directionality that is distinct from the manner in which the user is moving. Moreover, notification module 136 may also vary one or more parameters, including the size, shape, intensity, and frequency of the haptic sensation as the user moves.

Figure 2:
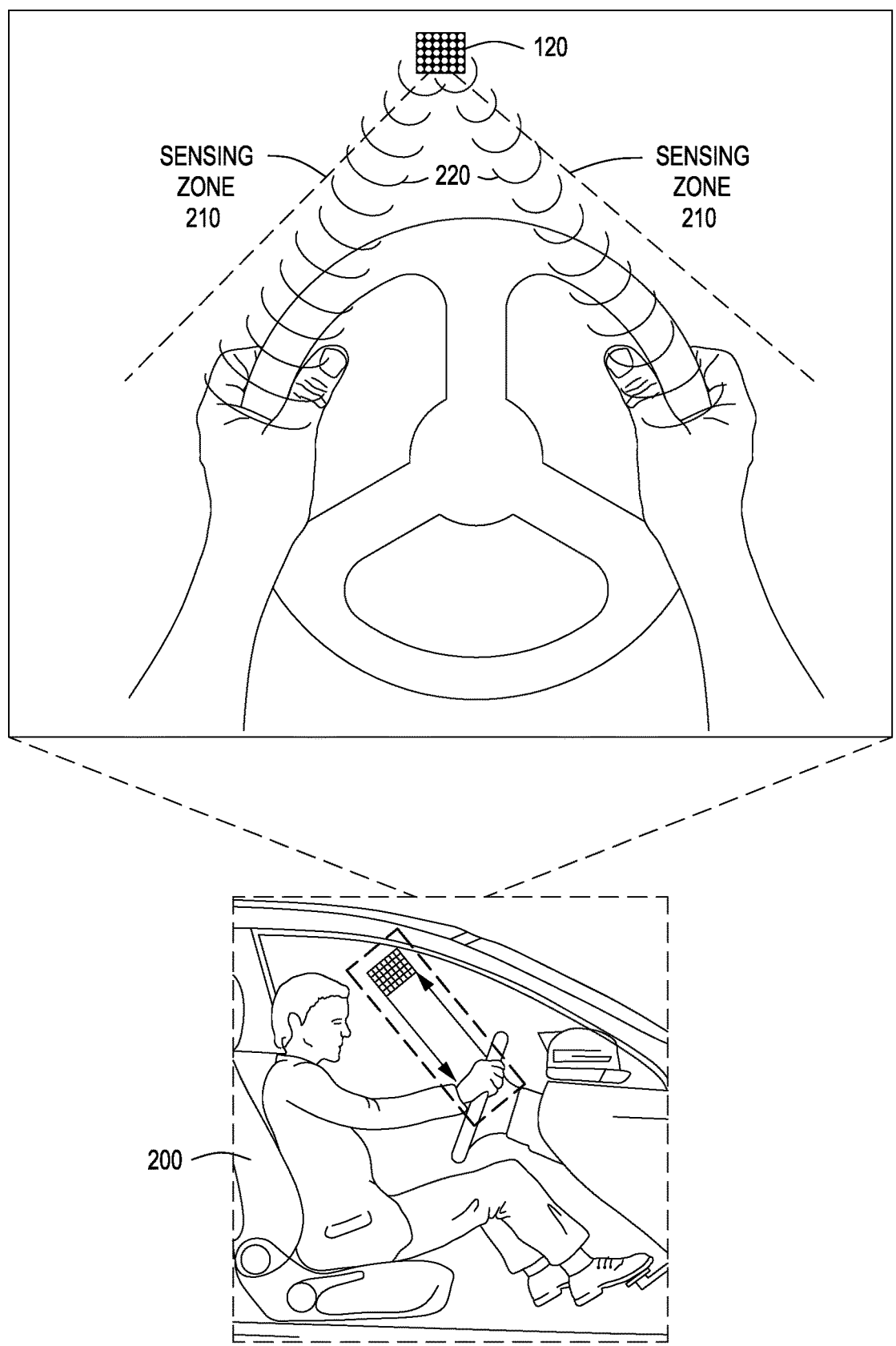
FIG. 2 illustrates a system environment that includes haptic transducer devices, according to various embodiments.

FIG. 2 illustrates a system environment 200 that includes haptic transducer devices 120 according to an embodiment. Haptic transducer devices 120 emit pings and detect ping echoes within sensing zone 210. Sensing zone 210 is defined as the area that sensing module 134 can image by configuring haptic transducer devices 120 to emit pings that probe the system environment 200, reflect off of objects, and generate ping echoes that are detected by haptic transducer devices 120. Sensing module 134 analyzes the detected ping echoes to identify objects in the system environment 200, encodes parameters associated with the object as object data, and transmits the object data to notification module 136. Notification module 136 determines a type of haptic sensation to generate on the object and configures the haptic transducer devices 210 to generate the haptic sensation on the object by emitting haptic output 220.

In one embodiment, the system environment 200 comprises a vehicle. In such an embodiment, haptic transducer devices 120 may be located above the driver. Alternatively or additionally, haptic transducer devices 120 may be located above the steering column, under the steering column, to the side of the driver, on the vehicle dashboard, around the vehicle console, and so forth. The location of haptic transducer devices 120 affects the region of system environment 200 that sensing module 134 can image by configuring haptic transducer devices 120 to generate pings and detect ping echoes. In particular, if haptic transducer devices 120 are located above the driver, then sensing module 134 configures haptic transducer devices 120 to generate pings in order to image the environment proximate to haptic transducers devices 120. In particular, sensing module 134 could analyze ping echoes from the emitted pings that have reflected off of the driver's head, shoulders, arms, and hands, in addition to the steering wheel. If haptic transducer devices 120 are located under the steering column, then sensing module 134 could image the driver's feet, the brake pedal, the throttle, and the clutch pedal by analyzing ping echoes from pings emitted by haptic transducer devices 120.

Similarly, the location of haptic transducer devices 120 also defines where in system environment 200 haptic output 220 can be generated. For instance, if haptic transducer devices 120 are located above the driver, then notification module 136 typically configures haptic transducer devices 120 to direct haptic output 220 to the driver's hands, arms, shoulders, and face. The haptic output 220 generates the haptic sensation specified by notification module 136 on the user. Alternatively or additionally, if haptic transducer devices 120 are located under the steering column, then notification module 136 typically configures haptic transducer devices 120 to generate haptic output 220 to the driver's legs, ankles, and feet. Haptic output 220 generates the haptic sensation specified by notification module 136 on the user.

The haptic sensation may indicate to the user that she should take a particular action. For example, in system environment 200, notification module 136 could configure haptic transducer devices 120 to generate a haptic sensation on the driver's hands, which moves from the right to the left in order to indicate to the driver that she should steer the vehicle to the left. In addition, notification module 136 may configure haptic transducer devices 120 to generate other types of haptic sensations on the user in order to convey information to the user or to suggest to the user that she should take a particular course of action.

In order to coordinate the ping generation, ping echo detection, and haptic output generation of the haptic transducer devices 120, sensing module 134 and notification module 136 configure haptic transducer devices 120 to operate in one of: the dedicated mode, the switching mode, and the hybrid mode, as stated above. In particular, in the dedicated mode, each of haptic transducer devices 120 is configured to execute a single function. For example, one haptic transducer device could generate pings, another could detect ping echoes, and a third could generate haptic output.

Figure 3:
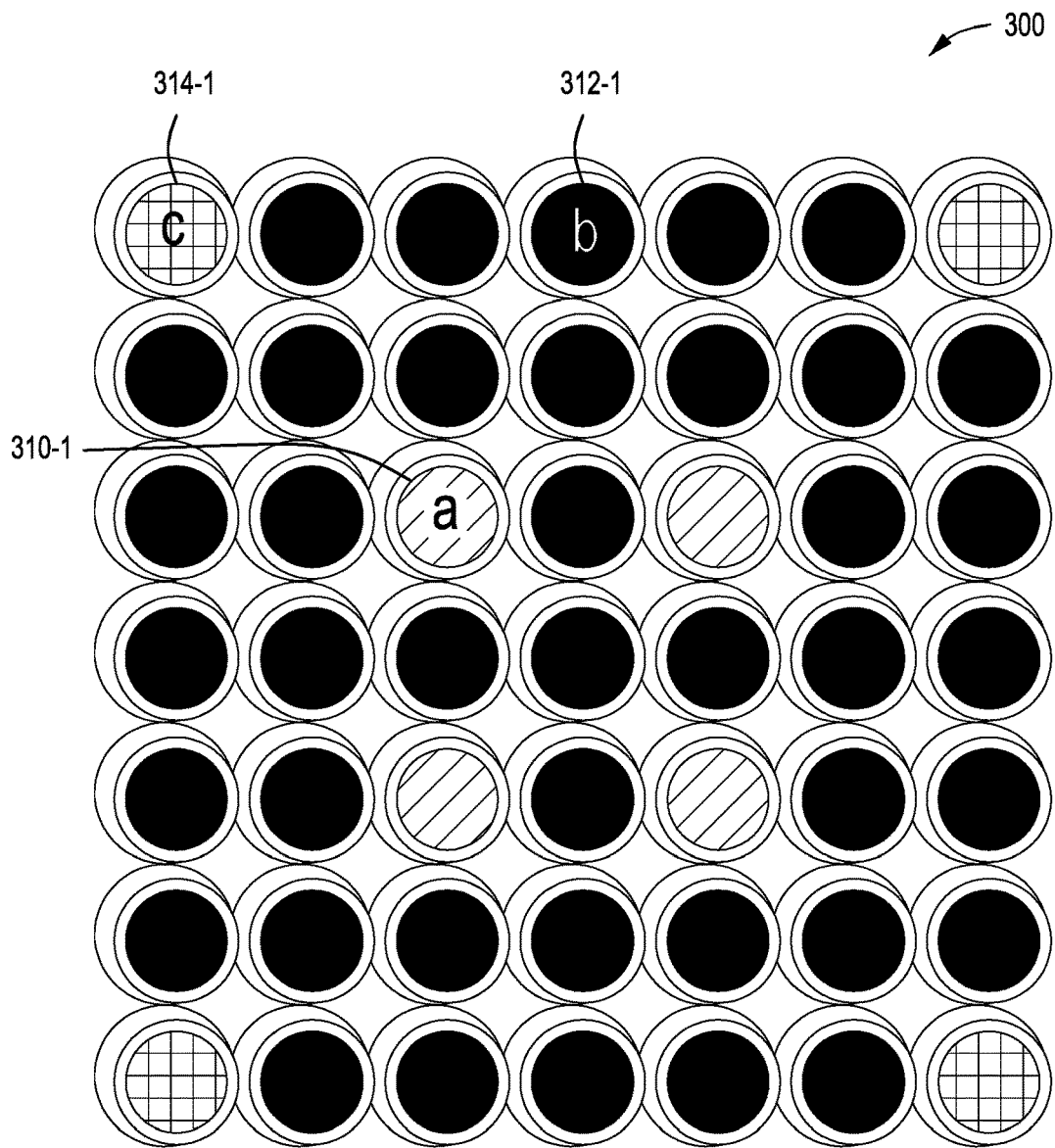
FIG. 3 illustrates a transducer array for implementing haptic transducer devices in the dedicated mode, according to various embodiments.

FIG. 3 illustrates a transducer array 300 for implementing haptic transducer devices 120 in the dedicated mode. Haptic output devices 120 are herein also referred to as transducers. As shown, transducer array 300 includes transducers A 310 that generate pings, transducers B 312 that generate haptic output, and transducers C that detect ping echoes incident on the transducer array 300. In other embodiments, transducers A 310, transducers B 312, and transducers C 314 may each be arranged in distinct transducer arrays 300 and/or may be integrated together into multiple transducers arrays 300.

FIG. 4 illustrates a state diagram of the operation of transducers A 310, transducers B 312, and transducers C 314 of transducer array 300. As shown, transducers A 310, transducers B 312, and transducers C 314 may each operate in the detection state 420, the ping state 422, or the haptic output state 424. In the detection state 420, sensing module 134 configures haptic transducer devices 120 to detect ping echoes. In the ping state 422, sensing module 134 configures haptic transducer devices 120 to generate pings. In the haptic output state 424, notification module 136 configures the haptic output devices 120 to generate haptic output, which generates a haptic sensation on the user.

As shown in FIG. 4, transducers A 310 are in the ping state 422 beginning at time $t_0$. Transducers A 310 remain in the ping state 422 until sensing module 134 or notification module 136 changes the mode of the transducer array 300. Also at time $t_0$, transducers B 312 are in the haptic output state 424 and transducers C 314 are in the detection state 420. Transducers B 312 and transducers C 314 remain in the haptic output state 424 and the detection state 420, respectively, until sensing module 134 or notification module 136 changes the mode of the transducer array 300.

In the dedicated mode, transducers C 314 are consistently detecting ping echoes from the environment. Therefore, regardless of whether an object is close to the transducer array 300 or further away from transducer array 300, ping echoes that are incident on the transducer array 300 are detected by transducers C 314. When an object is close to the transducer array 300, ping echoes take a substantially shorter time to arrive at the transducer array 300. Thus, when imaging a new environment, sensing module 134 may implement the dedicated mode to increase the likelihood that ping echoes from pings reflected off of objects that are close to the transducer array 300 are detected. In addition, if sensing module 134 determines that the distance between an object and the transducer array 300 is decreasing, then sensing module 134 may configure the transducer array 300 to implement the dedicated mode. Implementing the dedicated mode increases the likelihood that haptic transducer devices 120 are configured in time to detect ping echoes that arrive at the transducer array 300 more quickly due to the decreasing separation between the transducer array 300 and the object.

Furthermore, notification module 136 may configure the haptic transducer array 300 to implement the dedicated mode when configuring haptic transducer devices 120 to generate a constant haptic sensation on a stationary object. Implementing the dedicated mode, allows notification module 136 to configure a subset of haptic transducer devices 120 to generate a set of haptic sensations without coordinating the output of multiple sets of haptic devices in various positions to generate a haptic sensation that appears to the user to be constant and static.

Figure 5C:
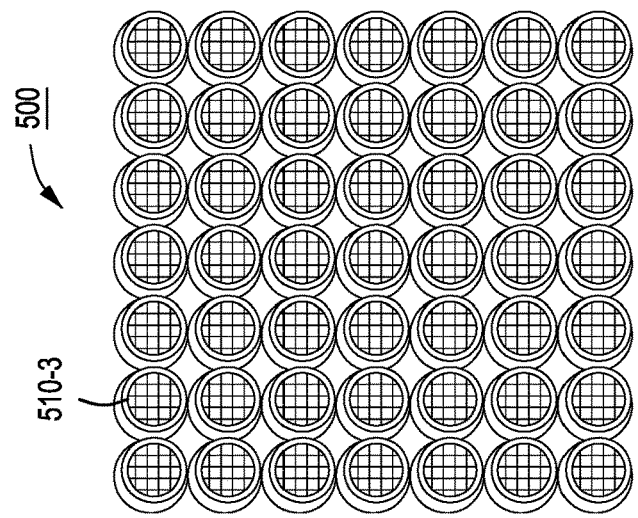
FIGS. 5A-5C illustrate a transducer array for implementing haptic transducer devices in the switching mode, according to various embodiments.
Figure 5B:
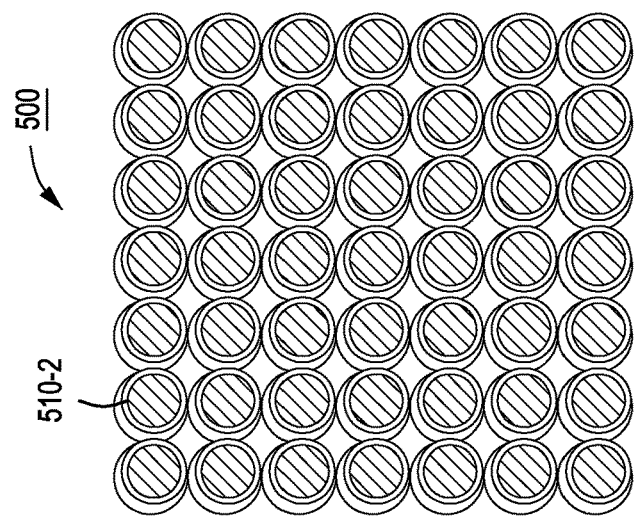
Figure 5A:
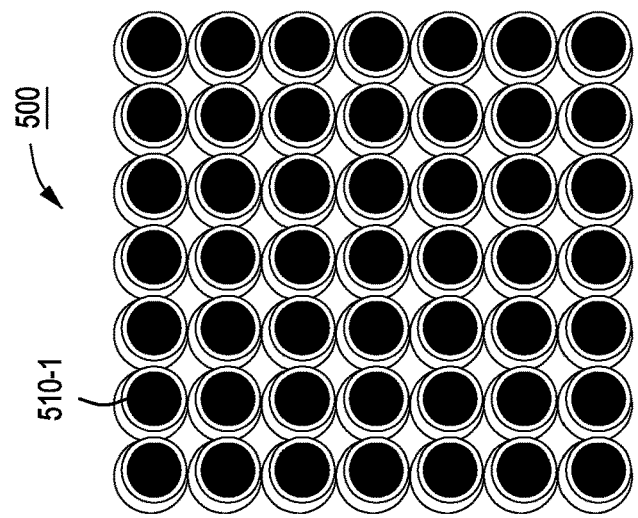

FIGS. 5A-5C illustrate a transducer array 500 for implementing haptic transducer devices 510 in the switching mode. As shown in FIG. 5A, transducers 510 generate a haptic sensation by directing haptic output towards a user. In FIG. 5B, transducers 510 generate a ping, which travels into the environment and reflects off of objects in the environment as ping echoes. In FIG. 5C, transducers 510 detect ping echoes that are incident on the transducer array 500. In some embodiments, transducers 510 switch between each of the haptic transducer device functionalities at a similar time, where every transducer 510 executes the same function at a particular point in time. In other embodiments, transducers 510 may execute different functions, but may switch between executing a first function and executing a second function at a similar point in time. Additionally or alternatively, each of transducers 510 may switch between executing a first function and a second function at a different point in time, where the first function and the second function may vary between any two of transducers 510.

As stated above, sensing module 134 may implement the switching mode in order to increase the number of frequencies/frequency patterns implemented when generating pings. If every transducer 510 in the transducer array 500 generates pings during a particular interval of time, then sensing module 134 may configure each transducer 510 to generate a ping with a unique frequency and/or frequency pattern in order to increase the resolution to which sensing module 134 can image various objects in the environment. For example, increasing the number of frequencies/frequency patterns implemented in generating pings may increase the number of surface details that sensor module 134 can detect, facilitating the sensor module 134 in identifying more characteristics of an object.

As noted above, sensing module 134 may determine a time at which to configure the transducers 510 to switch from generating pings to detecting ping echoes. For example, sensing module 134 could configure transducers 510 to generate pings for 3 milliseconds and then switch to detecting ping echoes. Transducers 510 could detect ping echoes for 3 milliseconds before switching, for the next 200 milliseconds, to generating haptic sensations by directing haptic output to a user. Additionally or alternatively, after the approximate position of an object in the environment has been determined, sensing module 134 may calculate an estimated amount of time that a ping with a particular frequency/frequency pattern takes to travel to an object and for the reflected ping echo to travel back to the transducers 510. Based upon the calculated time, sensing module 134 may determine a time at which to switch one or more of transducers 510 from generating pings to detecting ping echoes. Sensing module 134 could configure each of transducers 510 to switch from generating pings to detecting ping echoes when a ping echo is proximate to the particular transducer.

Implementing such techniques could increase the amount of ping echoes that can be detected by the transducers 510. In addition, notification module 136 may configure various transducers in transducers 510 to generate haptic output during time intervals when ping echoes are not predicted to arrive at those particular transducers.

In addition, sensing module 134 may coordinate the ping generation and ping echo detection of multiple transducer arrays that are located at various positions proximate to an object in order to detect ping echoes that are reflected at a wide variety of angles. Detecting ping echoes that are reflected at a range of angles may further facilitate sensing module 134 in determining various surface characteristics of the object, which may aid sensing module 134 in determining the type of object that is present in the environment.

FIG. 6 illustrates a state diagram of the operation of transducers 510 of a transducer array 500 in the switching mode. As shown, at time $t_1$, transducers 510 are in the haptic output state 624, where each of transducers 510 generates haptic output. At time $t_2$, transducers 510 are in the ping state 622, where each of transducers 510 generates pings. At time $t_3$, transducers 510 are in the detection state 620, where each of transducers 510 detects ping echoes. At time $t_4$, transducers 510 return to the haptic output state 624, where each of transducers 510 generates haptic output.

As shown, each of transducers 510 executes the same function at a given point in time. Further, as described above, sensing module 134 and notification module 136 determines the values of $t_1$, $t_2$, $t_3$, and $t_4$, which each indicate a time at which transducers 510 switch from executing one functionality to executing a second functionality. Sensing module 134 and notification module 136 may access user preference data and/or pre-sets in database 138 to select the values of $t_1$, $t_2$, $t_3$, and $t_4$ for the switching mode or may calculate the values of $t_1$, $t_2$, $t_3$, and $t_4$ based on the frequency/frequency patterns of the pings, as described above.

Figure 7A:
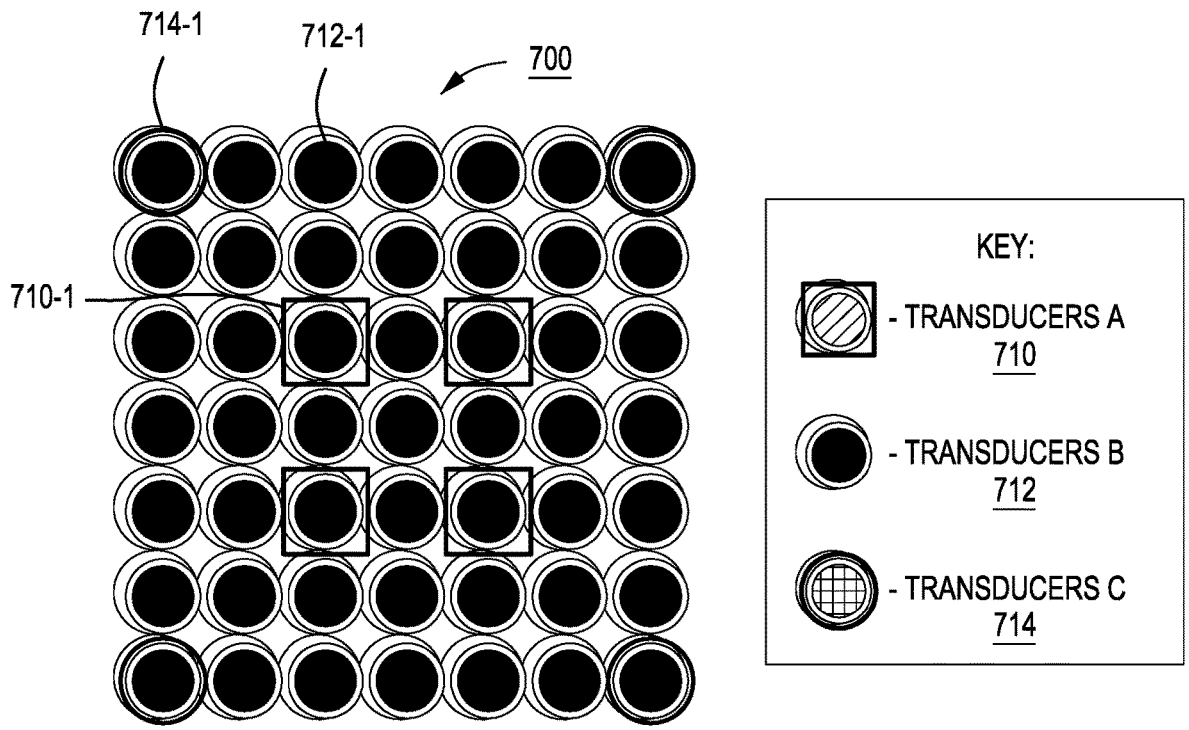
FIGS. 7A-7B illustrate a transducer array for implementing the functionality of haptic transducer devices in the hybrid mode, according to various embodiments.
Figure 7B:
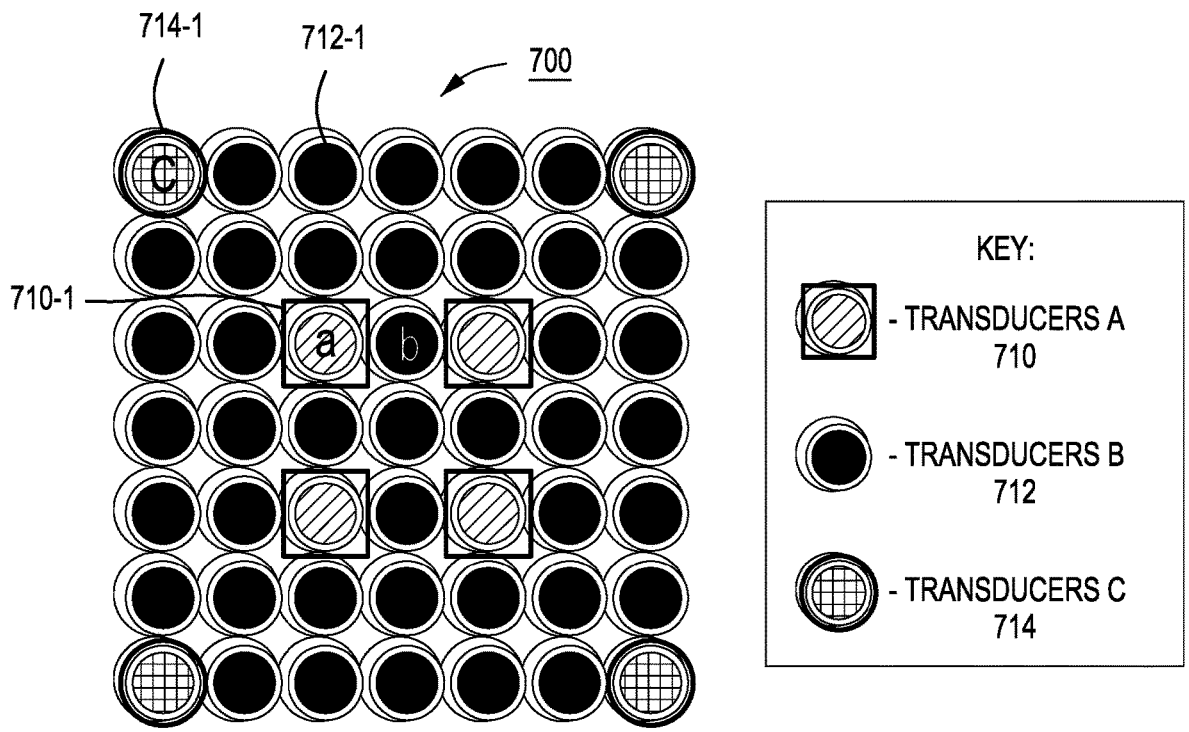

FIGS. 7A-7B illustrate a transducer array 700 for implementing the functionality of transducers A 710, transducers B 712, and transducers C 714 in the hybrid mode. As shown in FIG. 7A, transducers A 710, transducers B 712, and transducers C 714 are configured to generate haptic sensations by generating haptic output. As shown in FIG. 7B, transducers A 710, generate pings, transducers B 712 generate haptic sensations, and transducers C 714 detect ping echoes.

In the hybrid mode, one or more haptic transducer devices 120 remain in one state for a given interval of time, while other haptic transducer devices 120 switch between two or more states during that interval of time. As shown in FIGS. 7A-7B, transducers B 712 remain in one state, while transducers A 710 and transducers C 714 switch between two states. In particular, transducers B 712 remain in the haptic output state. Transducers A 710 switch between the haptic output state and the ping state. In addition, transducers C 714 switch between the haptic output state and the detection state.

The following discussion is directed towards a technique for identifying whether sensing module 134 or notification module 136 configures the transducers A 710 to execute a function. The discussion applies to transducers C 714 as well.

In one embodiment, sensing module 134 configures transducers A 710 to enter the ping state for a given period of time and to revert back to the haptic output state after a set amount of time. In another embodiment, notification module 136 configures transducers A 710 to enter the haptic output state for a given period of time and to revert back to the ping state after a set amount of time. In yet another embodiment, sensing module 134 configures transducers A to enter the ping state, when sensing module 134 is imaging the environment. Transducers A 710 remain in the ping state until notification module 136 determines that transducers A 710 should be configured to generate haptic sensations. For example, notification module 136 could determine that the number of haptic transducer devices 120 configured to generate a particular type of haptic sensation should be increased in order to increase the intensity of the sensation on the user. If notification module 136 determines that transducers A 710 should be used for generating a haptic sensation, then notification module 136 configures transducers A 710 to enter and remain in the haptic output state.

In some embodiments, sensing module 134 may determine that one or more haptic transducer devices 120 should be configured to execute a function and notification module 136 may determine that those particular haptic transducer devices 120 should be configured to execute a different function at a substantially similar time. For example, sensing module 134 could determine that transducers A 710 should be in the ping state and notification module 136 could determine that transducers A 710 should be in the haptic output state at a particular point in time. In such an instance, notification module 136 may consistently override sensing module 134 or sensing module 134 may consistently override notification module 136. Alternatively, haptic notification application 132 may determine whether sensing module 134 overrides notification module 136 or notification module 136 overrides sensing module 134. For example, if an object in the environment is well-localized and the object type has been identified, then notification module 136 could override sensing module 134 and transducers A 710 could enter the haptic output state. However, if the object is not well-localized and has not been identified, then sensing module 134 could override notification module 136 and the transducers A 710 could enter the ping state. In addition, the haptic notification application 132 may access database 138 and implement various algorithms stored therein in order to determine how to allocate haptic transducer devices 120 between the ping state, the detection state, and the haptic output state.

In one embodiment, one set of haptic transducer devices 120 generates pings, while another set of haptic transducer devices 120 detects pings. As shown in FIG. 7B, the transducers A 710 generate pings and the transducers C 714 detect ping echoes. Utilizing separate sets of haptic output devices 120 to generate pings and detect ping echoes may facilitate sensing module 134 in imaging a specific aspect of an object. For example, in FIG. 7, the transducers C 714 are located at the corners of transducer array 700. Positioning transducers C 714 at the corner of the transducer array 700 when detecting ping echoes facilitates the transducer C 714 in detecting ping echoes from pings that have reflected off of an object at various angles. In addition, transducers A 710 are located at the center of the transducer array 700. Positioning transducers A 710 at the center of transducer array 700 could reduce the spatial distribution of the emitted pings, thereby facilitating sensor module 134 in imaging a small object or a small section of a larger object. As demonstrated, sensing module 134 and/or notification module 136 may configure one or more haptic transducer devices 120 to generate pings and/or detect ping echoes based on the location and orientation of the particular haptic transducer device(s) 120.

Figure 8:
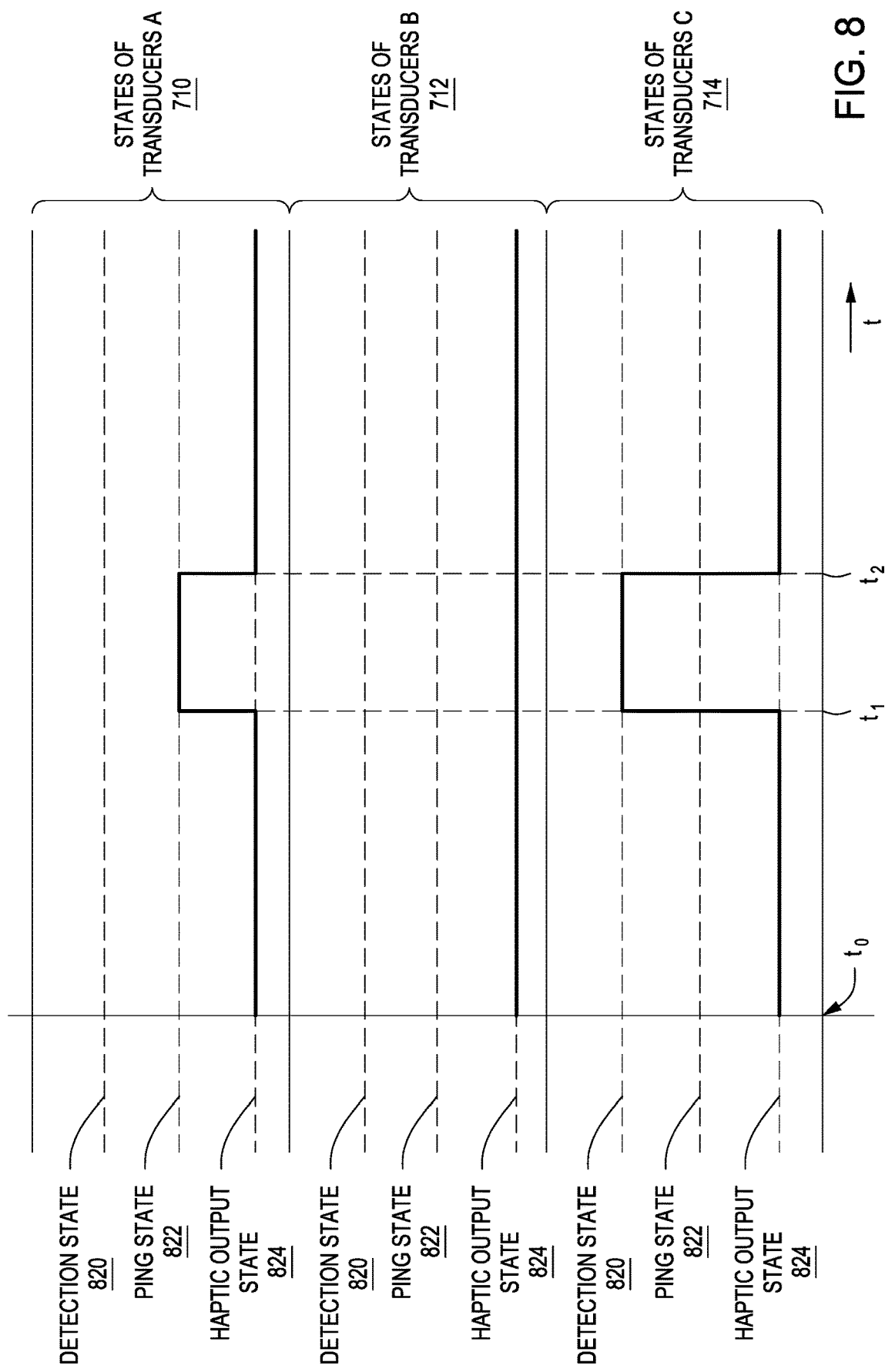
FIG. 8 illustrates a state diagram of the haptic transducer devices included in a transducer array configured to implement the hybrid mode, according to various embodiments.

FIG. 8 illustrates a state diagram of transducers A 710, transducers B 712, and transducers C 714 included in transducer array 700 configured to implement the hybrid mode. As shown, each of transducers A 710, transducers B 712, and transducers C 714 can operate in the haptic output state 824, the ping state 822, and the detection state 820.

As described above, the hybrid mode is defined by one or more haptic transducer devices 120 operating in a single state during a set period of time, while other haptic transducer devices 120 switch between two or more states. In FIG. 8, transducers B 712 operate in the haptic output state 824 from time $t_0$ onwards. Transducers A 710 and transducers C 714 switch between the haptic output state 824 and the ping state 822 or the detection state 820, respectively.

As shown, from time $t_0$ to time $t_1$, transducers A 710 are in the haptic output state 824. At time $t_1$, sensing module 134 configures transducers A 710 to enter the ping state 822. Transducers A 710 remain in the ping state 822 from time $t_1$ to time $t_2$. At time $t_2$, transducers A 710 revert back to the haptic output state 824.

Similarly, from time $t_0$ to time $t_1$, transducers C 714 are in the haptic output state 824. However, at time $t_1$, sensing module 134 configures transducers C 714 to enter the detection state 820. Transducers C 714 remain in the detection state 820 from time $t_1$ to time $t_2$. At time $t_2$, transducers C 714 revert back to the haptic output state 824.

Figure 9:
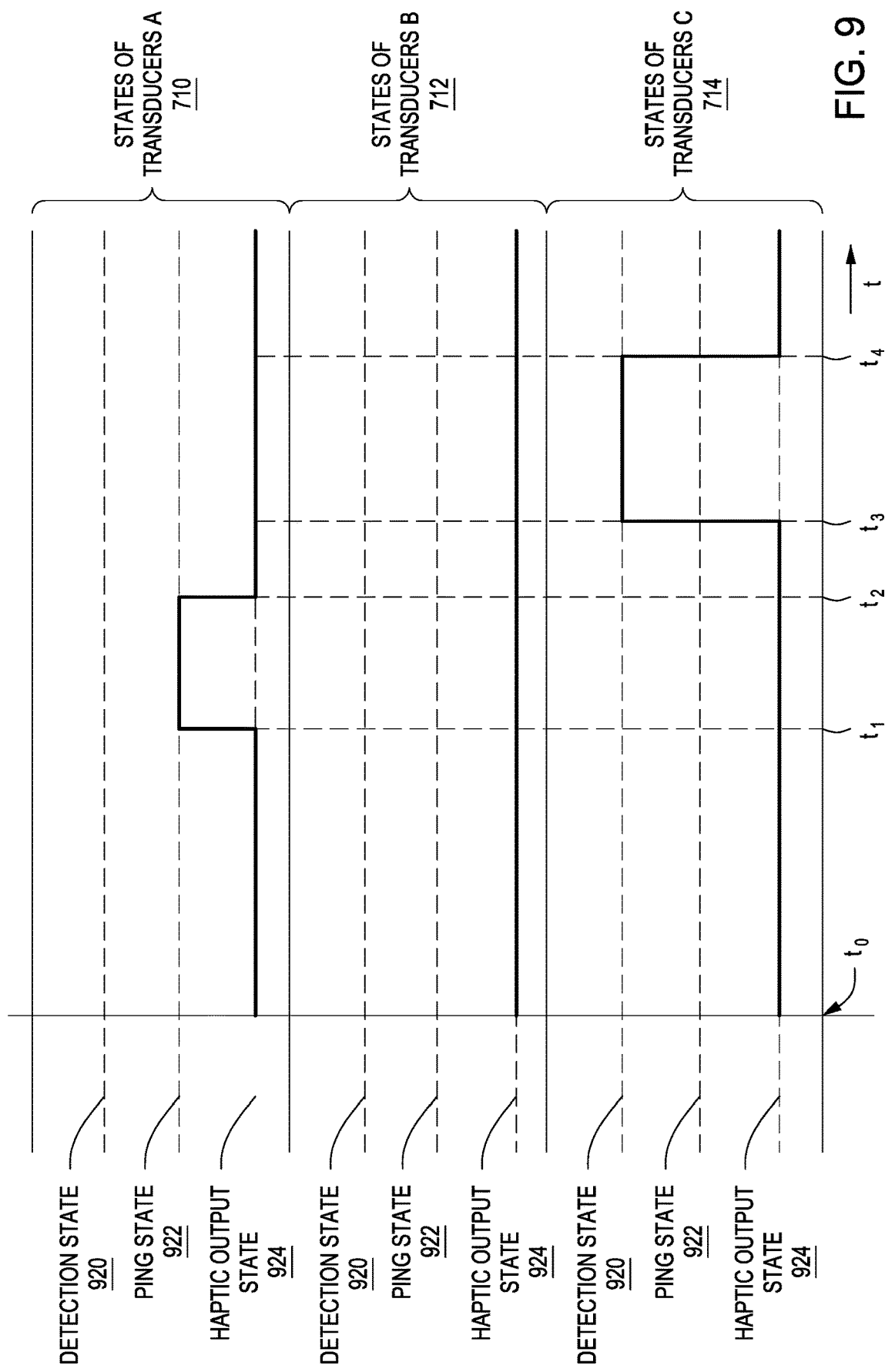
FIG. 9 illustrates a second state diagram of the haptic transducer devices included in transducer array that are configured to implement the hybrid mode, where a time delay is implemented between ping generation and ping echo detection, according to various embodiments.

FIG. 9 illustrates a second state diagram of transducers A 710, transducers B 712, and transducers C 714 included in transducer array 700 configured to implement the hybrid mode, where a time delay is implemented between ping generation and ping echo detection. As shown, each of transducers A 710, transducers B 712, and transducers C 714 can operate in the haptic output state 924, the ping state 922, and the detection state 920.

As described above, sensing module 134 may configure one or more haptic transducer devices 120 to enter the detection state 920 when sensing module 134 determines that a ping echo is likely to arrive at the particular haptic transducer device 120. As shown, transducers A 710 generate pings from time $t_1$ to time $t_2$. Sensing module 134 implements a time delay between time $t_2$ and time $t_3$. During the time interval (i.e., between time $t_2$ and time $t_3$), the emitted pings travel to objects in the environment and ping echoes reflect off of those objects. Based on the speed at which the ping travels and the approximate locations of objects in the environment, sensing module 134 determines that the likelihood that a ping echo reaches the transducer array 700. In one embodiment, sensor module 134 divides the approximate distance between the target object and the transducer array 700 by the approximate speed of the ping and/or ping echo in order to calculate a time at which the ping echo is likely to arrive at the transducers 700. Sensor module 134 also calculates an approximate time error in the calculation by using various methods in statistical analysis. Sensor module 134 determines an expected time interval at which ping echoes will arrive at the transducers array 700. In particular, sensor module 134 determines that the likelihood that a ping echo will arrive at transducers 700 before time $t_3$ is low. Therefore, until time $t_3$, transducers C 714 operate in the haptic output state 924. At time $t_3$, sensing module 134 configures transducers C 714 to detect ping echoes, because the likelihood that ping echoes will arrive at transducers C 714 is high. Sensing module 134 determines that the likelihood that a ping echo reaches transducer array 700 after time $t_4$ is low. Therefore, at time $t_4$, the transducers C 714 revert back to the haptic output state 924, as shown.

FIGS. 10A-10E illustrate a transducer array 1000 that includes transducers 1010 and microphones 1020 that are configured to implement the dedicated mode, the switching mode, and the hybrid mode. In one embodiment, microphones 1020 are implemented on transducer arrays 1000. Microphones 1020 may include, without limitation, dynamic microphones, piezo electric microphones, condenser microphones, MEMS microphones, liquid microphones, carbon microphones, fiber optic microphones, electret microphones, laser microphones, ribbon microphones, capacitor microphones, crystal microphones, any type of electroacoustic transducer, and so forth. In particular, the microphones 1020 detect ping echoes directed towards transducer array 1000 from pings that have reflected off of objects in the environment. The microphones 1020 convert the detected ping echoes into electrical signals and transmit those electrical signals to sensing module 134. Microphones 1020 may be implemented on transducer array 1000 in any or all of the dedicated mode, the switching mode, and the hybrid mode.

Figure 10A:
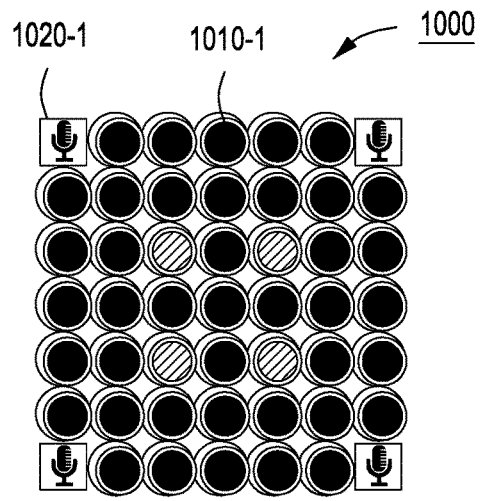
FIGS. 10A-10E illustrate a transducer array that includes both haptic transducer devices and microphones, configured to implement any of the dedicated mode, the switching mode, and the hybrid mode, according to various embodiments.
Figure 10B:
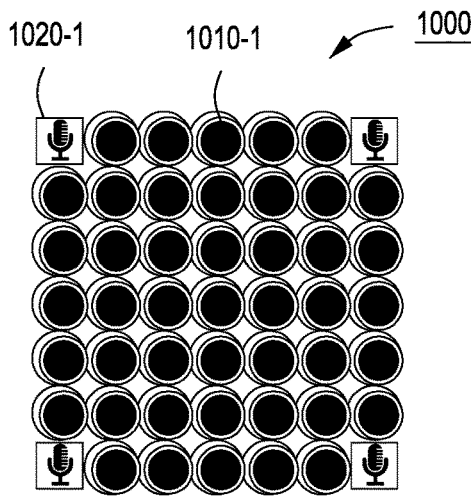
Figure 10C:
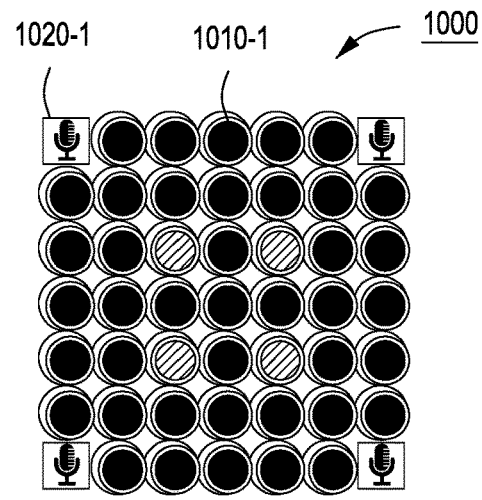
Figure 10D:
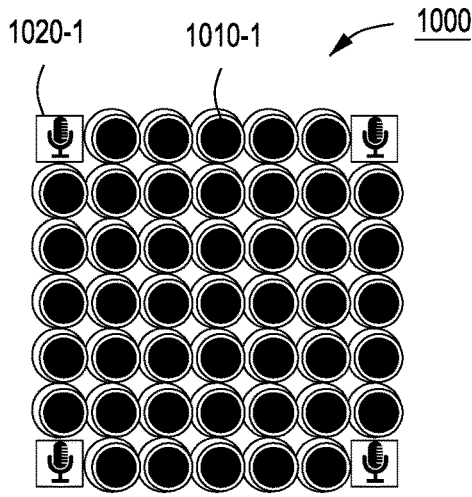
Figure 10E:
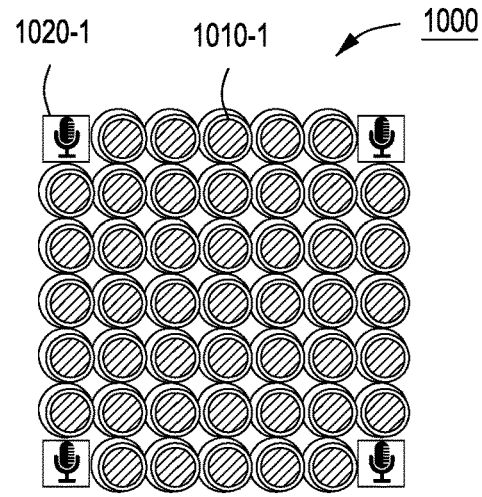

FIG. 10A illustrates microphones 1020 included in transducer array 1000 operating in the dedicated mode. In some embodiments, in the dedicated mode, transducers 1010 are configured to operate in the ping state and the haptic output state when microphones 1020 are included in transducer array 1000. FIGS. 10B-10C illustrate microphones 1020 included in transducer array 1000 in the hybrid mode, and FIGS. 10D-10E illustrate microphones 1020 included in transducer array 1000 in the switching mode. In each of these modes, the microphones 1020 detect ping echoes. In various embodiments, when microphones 1020 are included in transducer array 1000, the transducers 1010 switch between the haptic output state and the ping state and none of the transducers 1010 operates in the detection state.

FIG. 11 illustrates a state diagram of a transducer array for implementing the switching mode, where each set of haptic transducer devices 120 execute a sequence of functions in a successive manner, according to various embodiments. The transducer array includes transducers A 1110, transducers B 1112, and transducers C 1114. Each of transducers A 1110, transducers B 1112, and transducers C 1114 can operate in the detection state 1120, the ping state 1122, and the haptic output state 1124. As stated above, in the ping state 1122, the transducers generate pings that travel into the environment and reflect off of objects in the environment, generating ping echoes. In the detection state 1120, the transducers detect ping echoes, and in the haptic output state 1124, the transducers generate haptic output that generates a sensation on a user.

As illustrated in FIG. 11, each transducer switches between the functions of generating haptic output, generating pings, and detecting ping echoes. In one embodiment, each transducer generates pings and then detects ping echoes incident on the transducer from the emitted pings. Additionally or alternatively, each transducer may detect ping echoes from pings that are generated by other transducers.

As shown, there is a time interval, $t_3$ to $t_4$, between transducers A 1110 detecting ping echoes and transducers B 1112 generating pings. Sensing module 134 may implement such a time interval when sensing module 134 determines that, based on the position of objects in the environment, that there is a low likelihood that there will be ping echoes proximate to any of transducers A 1110, transducers B 1112, and transducers C 1114. Furthermore, sensing module 134 may implement such a time interval in order to process ping echoes detected by transducers A 1110 and to use object data generated from analyzing the ping-ping echo pairs to configure the type of pings generated by transducers B 1112. For example, sensing module 134 could configure transducers B 1112 to generate pings with a higher intensity if sensing module 134 determines, based on analyzing ping-ping echo pairs from transducers A 1110, that the objects is moving away from the transducers B 1112. Generating pings with a higher intensity could increase the intensity of ping echoes detected by the transducers, thereby facilitating sensing module 134 in imaging the object, when there is a large amount of attenuation in the ping echo intensity detected by the transducers.

In addition, there is a time interval, $t_6$ to $t_7$, where transducers A 1110, transducers B 1112, and transducers C 1114 all generate haptic output. In particular, notification module 136 may configure some or all transducers to generate haptic output. In one embodiment, depending on the type of haptic sensation being generated on the user, notification module 136 may configure all of the transducers to generate haptic output during repeated time intervals to generate a haptic sensation that varies in intensity, shape, position, etc. on the user in a periodic manner.

Figure 12:
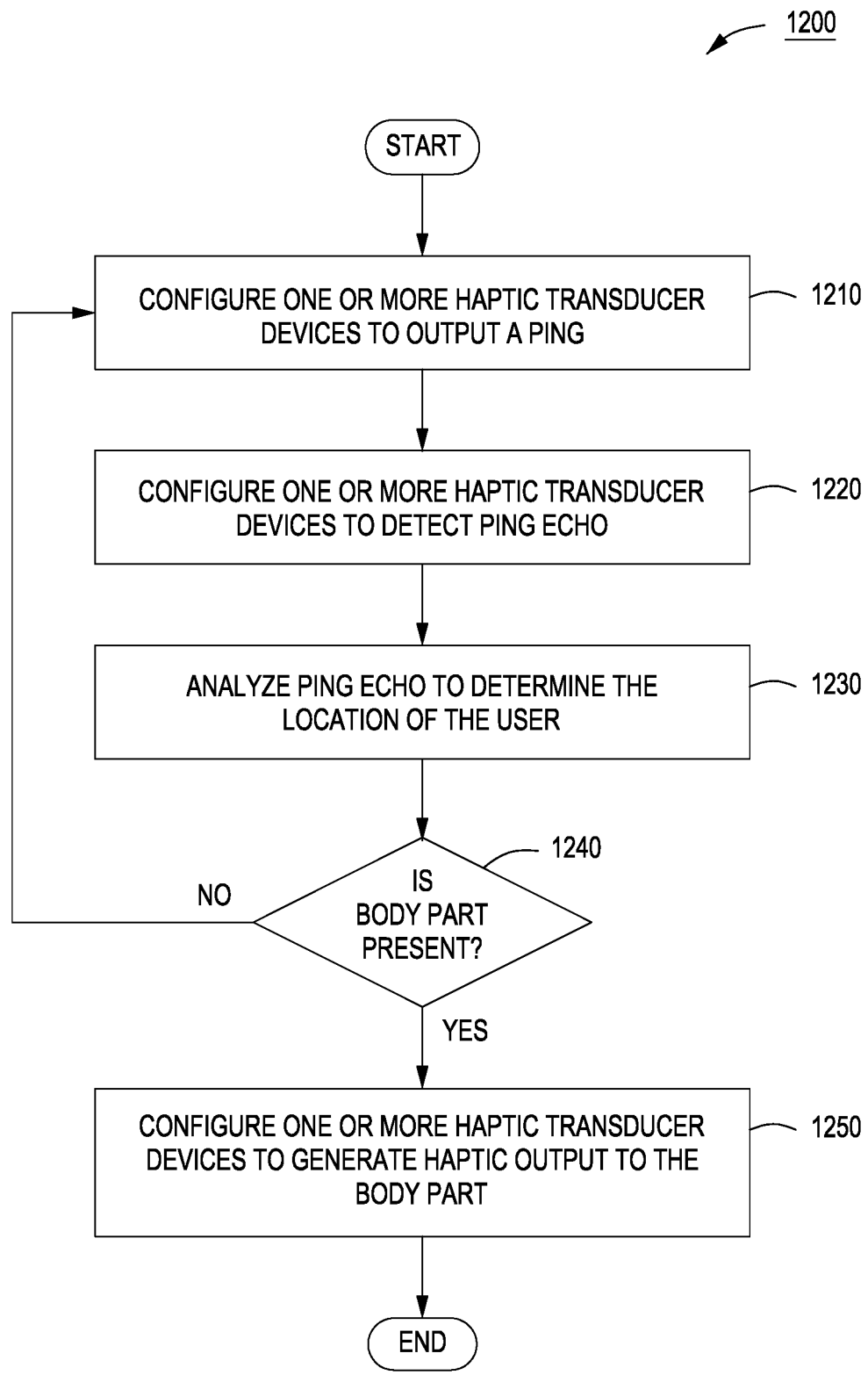
FIG. 12 illustrates a flow diagram of method steps for determining the location of a user with haptic transducer devices, according to various embodiments.

FIG. 12 illustrates a flow diagram of method steps to determine the location of a user with haptic transducer devices, according to various embodiments. Although the method steps are described in conjunction with the system of FIGS. 1-11, persons skilled in the art will understand that any system configured to perform the method steps, in any order, falls within the scope of the present disclosure.

As shown in FIG. 12, a method 1200 begins at step 1210, where sensing module 134 configures one or more haptic transducer devices 120 to output a ping. In some embodiments, at step 1210, sensing module 134 configures each haptic transducer device 120 to output a ping with a distinct frequency and/or frequency pattern. In various embodiments, the ping travels into the environment and reflects off of objects in the environment. Such reflection produces ping echoes, which travel towards one or more haptic transducer devices 120. At step 1220, sensing module 134 configures the one or more haptic transducer devices 120 to detect a ping echo. In various embodiments, the haptic transducer device(s) 120 convert the detected ping echo into an electrical signal. The haptic transducer device(s) 120 may further transmit the electrical signal to sensing module 134.

The method 1200 continues to step 1230, where sensing module 134 analyzes the ping echo to determine the location of the object. In various embodiments, sensing module 134 associates a ping echo with an outputted ping and determines the time interval between outputting the ping and detecting the ping echo. Based on that time interval and various characteristics of the ping echo, sensing module 134 may calculate the position of the object, how the object is moving, the orientation of the object, and so forth.

At step 1240, sensing module 134 determines if the object is the user. For example, sensing module could analyze the shape of the object to determine that the object is the user's hand. Sensing module 134 generates object data that encapsulates the various characteristics of the object and whether the object is the user. Sensing module 134 transmits that object data to notification module 136. Notification module 136 receives object data from sensing module 134 and analyzes the object data to determine whether to configure haptic transducer devices 120 to generate haptic output that generates a haptic sensation on the user. For example, if the object is the user, notification module 136 could determine the position and type of objects that are proximate to the user. Based on these positions and types, notification module 136 could determine that one or more haptic transducer devices 120 should generate haptic output. If the object is the user, then notification module 136 determines whether to configure one or more haptic transducer devices 120 to generate haptic output to the user. For example, notification module 136 could configure haptic transducer devices 120 to generate a pulsating haptic sensation that indicates to the user that she should take a particular action. If the object is not the user, then the method 1200 returns to step 1210, where sensing module 134 configures one or more haptic transducers devices 120 to output a ping.

In sum, the sensing module configures one or more haptic transducer devices to generate a ping. The sensing module also configures one or more haptic transducer devices to detect ping echoes generated from the ping that have reflected off of objects in the environment. The haptic transducer devices convert the ping echoes to electrical signals and transmit those electrical signals to the sensing module. The sensing module analyzes the electrical signals to generate object data that reflects one or more characteristics of the object. The sensing module transmits the object data to the notification module. The notification module analyzes the object data in order to determine a type of haptic sensation to generate on the user. The notification module configures the haptic transducer devices to generate haptic output that generates the haptic sensation on the user.

At least one advantage of the techniques described herein is that the position of a user can be determined by a mid-air haptic system without implementing external sensors. Using haptic transducer devices for both sensing and haptic output generation enables mid-air haptic systems that are smaller and less expensive than conventional types of mid-air haptic systems. Accordingly, the techniques described herein can be implemented to design mid-air haptic systems for size and cost constrained systems, such as mobile and/or wearable devices.

In particular, these techniques would be advantageously implemented in smartphones, smart watches, tablets, health monitoring wristbands, head mounted devices, and various other types of wearable and mobile devices. In addition, portable speakers and headphones would also benefit from the reduced bill of materials that the disclosed techniques enable. Furthermore, the disclosed techniques may be beneficial to Augmented Reality and Virtual Reality (AR/VR) systems. For example, the disclosed techniques could be implemented in stationary AR/VR systems included in tables, walls, ceilings, etc. Moreover, these techniques could be further implemented in wearable AR/VR systems, such as head mounted AR/VR devices.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for providing haptic output to an object with a haptic transducer device, the system comprising:
 a memory storing instructions; and
 a processor configured to execute the instructions to:
   configure one or more haptic transducer devices to output a ping,
   configure the one or more haptic transducer devices to detect a ping echo associated with the ping,
   identify a location of an object and a type of the object based on the ping echo,
   determine, based on the location of the object and the type of the object, a type of haptic sensation to deliver to the object,
   configure the one or more haptic transducer devices to generate haptic output corresponding to the type of haptic sensation, and
   configure the one or more haptic transducer devices to operate in one of a dedicated mode, a switching mode, or a hybrid mode.

2. The system of claim 1, wherein the one or more haptic transducer devices are included in an array of haptic transducer devices.

3. The system of claim 2, wherein the processor is further configured to execute the instructions to configure the one or more haptic transducer devices in the array to operate in the dedicated mode by configuring each haptic transducer device to generate pings, detect ping echoes, or generate haptic output.

4. The system of claim 2, wherein the processor is further configured to execute the instructions to configure the one or more haptic transducer devices in the array to operate in the switching mode by configuring each haptic transducer device to alternate between two or more of generating pings, detecting ping echoes, or generating haptic output.

5. The system of claim 2, wherein the processor is further configured to execute the instructions to configure the one or more haptic transducer devices in the array to operate in the hybrid mode by:

configuring a first set of the one or more haptic transducer devices to generate pings, detect ping echoes, or generate haptic output; and configuring a second set of the one or more haptic transducer devices to alternate between two or more of generating pings, detecting ping echoes, or generating haptic output.

6. The system of claim 5, wherein the processor is further configured to execute the instructions to configure the second set of the one or more haptic transducer devices to alternate between two or more of generating pings, detecting ping echoes, or generating haptic output by:

configuring a first subset of the second set of the one or more haptic transducer devices to generate the ping with a particular frequency pattern;

calculating a time at which the ping echo is predicted to arrive at a second subset of the second set of the one or more haptic transducer devices; and configuring the second subset of the second set of the one or more haptic transducer devices to detect the ping echo at the calculated time.

7. The system of claim 6, wherein the processor is further configured to execute the instructions to configure the second subset of the second set of the one or more haptic transducer devices to detect the ping echo at the calculated time by:

calculating a second time at which the ping echo is predicted to arrive at the first set of the one or more haptic transducer devices; and configuring the first set of the one or more haptic transducer devices to detect ping echoes when the second time at which the ping echo is predicted to arrive at the first set of the one or more haptic transducer devices is before the time at which the ping echo is predicted to arrive at the second subset of the second set of the one or more haptic transducer devices.

8. The system of claim 1, wherein the processor is further configured to execute the instructions to configure the one or more haptic transducer devices to output the ping by:

configuring a first haptic transducer device in the one or more haptic transducer devices to output the ping at a first frequency; and configuring a second haptic transducer device in the one or more haptic transducer devices to output the ping at a second frequency.

9. The system of claim 1, further comprising one or more microphones configured to detect ping echoes.

10. The system of claim 1, wherein at least one of the one or more haptic transducer devices comprises an ultrasonic transducer.

11. The system of claim 1, wherein identifying the location of the object comprises:

determining a time interval between the one or more haptic transducer devices outputting the ping and the one or more haptic transducer devices detecting the ping echo; and calculating a distance between the object and the one or more haptic transducer devices based on the time interval and a speed.

12. The system of claim 11, wherein the instructions, when executed by the processor, further cause the processor to identify the location of the object by:

configuring a first set of haptic transducer devices included in the one or more haptic transducer devices to generate a set of pings at different frequency patterns;

configuring a second set of haptic transducer devices included in the one or more haptic transducer devices to detect a set of ping echoes;

mapping each ping in the set of pings to one or more ping echoes in the set of ping echoes;

generating object data for the object detected based on the mapping, wherein the object data indicates a distance between the object and at least one haptic transducer device included in the one or more haptic transducer devices; and configuring at least one haptic output device included in the one or more haptic transducer devices to generate haptic output that travels towards the object.

13. A system for providing haptic output to an object, the system comprising:

one or more haptic transducer devices for:
generating a ping;
detecting a ping echo associated with the ping;
generating haptic output for delivering haptic sensation to an object, wherein:
a location of the haptic sensation and a type of the object are based on the ping echo; and
a type of the haptic sensation is based on the type of the object,
wherein the one or more haptic transducer devices operate in one of a dedicated mode, a switching mode, or a hybrid mode.

14. The system of claim 13, wherein, in the dedicated mode, each haptic transducer device generates pings, detects ping echoes, or generates haptic output.

15. The system of claim 13, wherein, in the switching mode, each haptic transducer device alternates between two or more of generating pings, detecting ping echoes, or generating haptic output.

16. The system of claim 13, wherein, in the hybrid mode, a first set of the one or more haptic transducer devices generates pings, detects ping echoes, or generates haptic output, and a second set of the one or more haptic transducer devices alternates between two or more of generating pings, detecting ping echoes, or generating haptic output.

17. The system of claim 16, wherein:
a first subset of the second set of the one or more haptic transducer devices generates the ping with a frequency pattern; and
a second subset of the second set of the one or more haptic transducer devices detects the ping echo at a time associated with the frequency pattern.

18. A method for providing haptic output to an object with a haptic transducer device, the method comprising:

configuring one or more haptic transducer devices to output a ping;

configuring the one or more haptic transducer devices to detect a ping echo associated with the ping;

identifying a location of an object and a type of the object based on the ping echo;

determining, based on the type of the object, a type of haptic sensation to deliver to the object; and configuring the one or more haptic transducer devices to generate haptic output corresponding to the type of haptic sensation and based on the location of the object, wherein the one or more haptic transducer devices operate in one of a dedicated mode, a switching mode, or a hybrid mode.

* * * * *